(12) United States Patent
Tanahashi et al.

(10) Patent No.: US 9,017,901 B2
(45) Date of Patent: *Apr. 28, 2015

(54) MANUFACTURING METHOD OF CELL ASSEMBLY FOR FUEL CELL AND MANUFACTURING METHOD OF FUEL CELL

(75) Inventors: Hideaki Tanahashi, Komaki (JP); Shinichi Haga, Kakamigahara (JP); Hideya Kadono, Kasugai (JP); Yutaka Ishioka, Nagoya (JP); Fumishige Shizuku, Seto (JP); Kenji Sato, Toyota (JP); Hiroo Yoshikawa, Toyota (JP)

(73) Assignee: Sumitomo Riko Company Limited, Aichi (JP)

( * ) Notice: Subject to any disclaimer, the term of this patent is extended or adjusted under 35 U.S.C. 154(b) by 627 days.

This patent is subject to a terminal disclaimer.

(21) Appl. No.: 13/203,989

(22) PCT Filed: Mar. 29, 2010

(86) PCT No.: PCT/JP2010/056113
§ 371 (c)(1),
(2), (4) Date: Aug. 31, 2011

(87) PCT Pub. No.: WO2010/114140
PCT Pub. Date: Oct. 7, 2010

(65) Prior Publication Data
US 2012/0009506 A1    Jan. 12, 2012

(30) Foreign Application Priority Data
Apr. 1, 2009    (JP) ................... 2009-088613

(51) Int. Cl.
*H01M 8/00* (2006.01)
*H01M 8/10* (2006.01)
(Continued)

(52) U.S. Cl.
CPC .......... *H01M 8/1004* (2013.01); *H01M 8/0273* (2013.01); *H01M 8/0276* (2013.01); *H01M 8/0284* (2013.01); *H01M 8/0286* (2013.01); *H01M 8/242* (2013.01); *Y02E 60/521* (2013.01)

(58) Field of Classification Search
CPC ....................................................... H01M 8/00
USPC .................. 429/510, 434, 535, 457
See application file for complete search history.

(56) References Cited

U.S. PATENT DOCUMENTS

| 6,451,469 B1 | 9/2002 | Nakamura et al. |
| 2002/0051902 A1* | 5/2002 | Suenaga et al. ......... 429/35 |

(Continued)

FOREIGN PATENT DOCUMENTS

| CA | 2 622 174 | 3/2007 |
| EP | 1 073 138 | 1/2001 |

(Continued)

OTHER PUBLICATIONS

U.S. Appl. No. 13/203,899 to Hideaki Tanahashi et al., filed Aug. 30, 2011.

(Continued)

*Primary Examiner* — Patrick Ryan
*Assistant Examiner* — Alex Usyatinsky
(74) *Attorney, Agent, or Firm* — Greenblum & Bernstein, P.L.C.

(57) ABSTRACT

A manufacturing method of a cell assembly for a fuel cell includes: producing an electrode member, a separator, and a seal member preform, which has a frame shape and which is formed from an uncrosslinked item of solid rubber having adhesiveness, in a predetermined shape in advance; arranging the electrode member, the separator, and the seal member preform in a forming die including a pressing member, and closing the forming die while the pressing member is pressing a side of the electrode member that is opposite to the separator in the thickness direction; and pressurizing and heating the forming die to crosslink the uncrosslinked item so that the seal member seals the peripheral edge portion of the electrode member and integrates the electrode member and the separator with each other.

4 Claims, 18 Drawing Sheets

(51) Int. Cl.
*H01M 8/02* (2006.01)
*H01M 8/24* (2006.01)

(56) References Cited

U.S. PATENT DOCUMENTS

| | | | |
|---|---|---|---|
| 2004/0137307 A1* | 7/2004 | Okonogi et al. | 429/37 |
| 2005/0100776 A1* | 5/2005 | Brunk et al. | 429/35 |
| 2009/0253014 A1 | 10/2009 | Tanahashi et al. | |
| 2010/0047649 A1* | 2/2010 | Yamada et al. | 429/30 |

FOREIGN PATENT DOCUMENTS

| | | |
|---|---|---|
| EP | 2 107 628 | 10/2009 |
| JP | 2001-510932 | 8/2001 |
| JP | 2005-47262 | 2/2005 |
| JP | 2008-123883 | 5/2008 |
| WO | 99/04446 | 1/1999 |

OTHER PUBLICATIONS

Search report from International Application No. PCT/JP2010/056113, mail date is Jun. 16, 2010.

Written Opinion from International Application No. PCT/JP2010/056113.

* cited by examiner

MANUFACTURING METHOD OF CELL ASSEMBLY FOR FUEL CELL AND MANUFACTURING METHOD OF FUEL CELL

TECHNICAL FIELD

The present invention relates to a manufacturing method of a cell assembly for a fuel cell in which an electrode member and a separator are integrated with each other, and to a manufacturing method of a fuel cell.

BACKGROUND ART

A Fuel cell generating electricity from electrochemical reactions of gases has a high power generation efficiency and an extremely small impact on the environment since the discharged gas is clean. Among these, the proton-exchange membrane fuel cell is capable of operating at relatively low temperatures and has a large output density. For this reason, its application to various fields such as power generation and as a power source for automobiles is anticipated.

In the proton-exchange membrane fuel cell, a cell in which separators sandwich a membrane electrode assembly (MEA) or the like serves as the unit of power generation. The MEA is formed from a polymer membrane (electrolyte membrane) acting as an electrolyte, and a pair of electrode catalyst layers (a fuel electrode (anode) catalyst layer and an oxygen electrode (cathode) catalyst layer) respectively arranged on both sides of the electrolyte membrane in the thickness direction. On the surfaces of the pair of electrode catalyst layers a gas diffusion layer is further disposed. Fuel gas such as hydrogen is supplied to the fuel electrode side, while an oxidizing gas such as oxygen and air is supplied to the oxygen electrode side. The supplied gas, the electrolyte, and the electrode catalyst layers are subjected to an electrochemical reaction at the three-phase boundary to generate electricity. The proton-exchange membrane fuel cell is structured by sandwiching a cell stack in which a plurality of the above cells are stacked together between end plates or the like disposed on both ends of the fuel cell in the cell stacking direction.

A manifold serving as a flow path for gas or water is formed on the peripheral edge portion of the cell stack. Mixing of the gases supplied to the respective electrodes creates issues such as lowered power generation efficiency. Also, the electrolyte membrane exhibits proton conductance in a state with water contained therein. Therefore, during operation the electrolyte must maintain a wet state. Accordingly, in order to prevent gas mixing and leakage, as well as maintain a wet state within the cells, a seal member is disposed on the peripheral edge portion of the manifold and the MEA (see Japanese Patent Application Publication Nos. JP-A-2008-123883, JP-W-2001-510932, and JP-A-2005-47262 for examples).

CITATION LIST

Patent Literature

PLT 1: JP-A-2008-123883
PLT 2: JP-W-2001-510932
PLT 3: JP-A-2005-47262

SUMMARY OF INVENTION

Technical Problem

According to Japanese Patent Application Publication Nos. JP-A-2008-123883 and JP-W-2001-510932, the electrode member and the seal member are integrated by injection molding of a liquid rubber for the seal member to the peripheral edge portion of the electrode member which is formed from the MEA, the gas diffusion layer, and so forth.

However, According to such conventional method, there are the following three issues. The first issue is the low mechanical strength of the seal member. In the conventional method, liquid rubber such as silicone rubber is used as the seal member. But most liquid rubber has a low molecular weight. As a consequence, there is little tensile strength after crosslinking. Since the liquid rubber also does not stretch much, the liquid rubber does not easily follow the expansion and contraction of the electrolyte membrane as a result of moisture and the like. Furthermore, silicone rubber does not have sufficient adhesiveness or acid resistance, which is problematic in terms of sealability and durability.

The second issue the risk of excessive impregnation with rubber to a porous layer during molding, when liquid rubber is used. Namely, when pouring and molding liquid rubber into the peripheral edge portion of the electrode member, the liquid rubber impregnates porous layers such as the gas diffusion layer. In such case, impregnation of the liquid rubber is difficult to control. Therefore, the flow of gas is impeded at regions excessively impregnated with the liquid rubber, and power generation performance is reduced by a corresponding amount.

The third issue is the risk of deformation of the electrolyte membrane during injection molding due to the injection pressure of the liquid rubber. The electrolyte membrane is a thin polymer film. Therefore, the flow of liquid rubber during injection molding may press against and deform the electrolyte membrane. If the electrolyte membrane is deformed, obtaining a desired power generation performance becomes difficult.

The present invention has been developed in view of such circumstances, and it is an object of the present invention to provide a convenient and time-saving method of manufacturing a cell assembly for a fuel cell in which an electrode member and a separator are integrated with each other by a seal member without using liquid rubber. It is another object of the present invention to provide a method of manufacturing a fuel cell from the manufactured cell assemblies.

Solution to Problem (1) In order to address the aforementioned issues, a first aspect of the present invention provides a manufacturing method of a cell assembly for a fuel cell, the cell assembly including: an electrode member having a membrane electrode assembly formed from an electrolyte membrane and a pair of electrode catalyst layers disposed on both sides of the electrolyte membrane in a thickness direction, and a pair of porous layers disposed on both sides of the membrane electrode assembly in the thickness direction; a separator having an electrode member arrangement portion arranged to be stacked with the electrode member and with which one side of the electrode member in the thickness direction is in contact, and a seal member arrangement portion having a frame shape and disposed on an outer side of the electrode member arrangement portion in a planar direction; and a seal member formed from a crosslinked item of solid rubber and disposed in the seal member arrangement portion to seal a peripheral edge portion of the electrode member along a shape of the peripheral edge portion and integrate the electrode member and the separator with each other, the method including the steps of: producing the electrode member, the separator, and a seal member preform, which has a frame shape and which is formed from an uncrosslinked item of solid rubber having adhesiveness, in a predetermined shape in advance, as a preliminary production step; arranging the electrode member, the separator, and the seal member preform in a forming die including a pressing member such that the electrode member is housed in a frame of the seal member preform and such that one side of the electrode member in the thickness direction is in contact with the electrode member arrangement portion, and closing the forming die while the pressing member is pressing the other side of the electrode member in the thickness direction, as a member arrangement step; and pressurizing and heating the forming die to crosslink the uncrosslinked item so that the seal member seals the peripheral edge portion of the electrode member and integrates the electrode member and the separator with each other, as an integration step.

The term "solid rubber" as used herein is an expression used in contrast to "liquid rubber", and refers to kneadable rubber that is solid at room temperature. That is, according to the manufacturing method of a cell assembly for a fuel cell (hereinafter occasionally simply referred to as a "cell assembly") of the present invention, rubber that is solid at room temperature is used rather than liquid rubber. Therefore, the seal member preform which is formed from an uncrosslinked item of solid rubber can be produced in a predetermined shape in advance. Consequently, the cell assembly for a fuel cell can be manufactured conveniently and in a short time by disposing the seal member preform having a frame shape in the forming die together with the electrode member and the separator and performing integral molding.

Since no liquid rubber is used, the above three issues can be resolved. That is, solid rubber has considerable tensile strength and elongation compared to liquid rubber. There is no need to regulate the amount of liquid rubber with which the porous layers are impregnated. Furthermore, there is no risk of the electrolyte membrane being deformed by the injection pressure of liquid rubber.

According to the manufacturing method of a cell assembly of the present invention, the forming die including the pressing member is used in the member arrangement step. In the case where integral molding was performed using a forming die including no pressing member, for example, the seal member preform (an uncrosslinked item of solid rubber) might flow due to pressurization to be deformed. If the seal member preform flowed, the electrode member might be misaligned to cause a failure such as warping and cracking of the electrode member. In this respect, misalignment of the electrode member during molding can be suppressed by closing the forming die while the pressing member is pressing one side of the electrode member. Accordingly, warping, cracking, and so forth of the electrode member can be suppressed.

In the integration step, the peripheral edge portion of the electrode member is sealed by the seal member formed from a crosslinked item of solid rubber. The electrode member and the seal member are strongly bonded to each other by the adhesive force of the solid rubber. Solid rubber has considerable tensile strength and elongation compared to liquid rubber. For this reason, the peripheral edge portion of the electrode member has high sealability. The seal member easily follows the expansion and contraction of the electrolyte membrane. Thus, according to the manufacturing method of a cell assembly of the present invention, a cell assembly for a fuel cell having a sealed region with high durability can be manufactured.

The electrode member and the separator of the manufactured cell assembly for a fuel cell are integrated with each other by the seal member. Therefore, the fuel cell can be easily assembled by stacking mainly the cell assemblies for a fuel cell. A desired cell assembly can be individually taken out from the fuel cell after the assembly as necessary. Therefore, the fuel cell can be easily inspected and repaired. In the case where a failure occurs in any cell assembly, it is also easy to replace only that particular cell assembly.

(2) According to a second aspect of the present invention, in the above configuration of (1), it is preferable that the seal member preform includes a first divided body and a second divided body divided in the thickness direction, a first temporary assembly, which is obtained by forming the first divided body in the seal member arrangement portion of the separator, the second divided body, and the electrode member are each produced in a predetermined shape in advance in the preliminary production step, and the seal member preform and the separator, which are formed by incorporating the first temporary assembly and the second divided body with each other, and the electrode member are arranged in the forming die in the member arrangement step.

In the present configuration, the seal member preform includes the first divided body and the second divided body divided in the thickness direction. Since the seal member preform is structured to include two divided bodies, the seal member preform can be produced to match the shape of the peripheral edge portion of the electrode member in the thickness direction.

The seal member preform (the first divided body and the second divided body) is formed from an uncrosslinked item of solid rubber having adhesiveness. Therefore, according to the present configuration, the electrode member can be positioned easily by producing the first temporary assembly which has the first divided body in the preliminary production step and disposing the electrode member in the frame of the first divided body in the member arrangement step.

To incorporate the first temporary assembly and the second divided body with each other, the second divided body may be disposed using the position of the first divided body as a reference. Namely, the second divided body may be disposed so as to be incorporated with the first divided body. Thus, the present configuration allows easy positioning of the electrode member and the seal member preform (seal member). Hence, the cell assembly for a fuel cell can be manufactured efficiently.

(3) According to a third aspect of the present invention, in the above configuration of (1), it is preferable that the seal member preform includes an outer divided body having a frame shape and an inner divided body having a frame shape and being smaller than the outer divided body, an inner temporary assembly, which is obtained by forming the inner divided body at the peripheral edge portion of the electrode member, the outer divided body, and the separator are each produced in a predetermined shape in advance in the preliminary production step, and the seal member preform and the electrode member, which are formed by incorporating the inner temporary assembly and the outer divided body with each other, and the separator are arranged in the forming die in the member arrangement step.

In the present configuration, the seal member preform includes the inner divided body and the outer divided body divided in the planar direction. The seal member preform (the inner divided body and the outer divided body) is formed from an uncrosslinked item of solid rubber having adhesiveness. Therefore, according to the present configuration, the electrode member can be positioned easily by producing the inner temporary assembly which has the inner divided body in the preliminary production step and disposing the inner divided body in the frame of the outer divided body in the member arrangement step. Moreover, at the same time as the electrode member is positioned, the inner divided body of the inner temporary assembly and the outer divided body can be incorporated with each other. That is, the seal member preform can be formed. Thus, the present configuration allows easy positioning of the electrode member and the seal member preform (seal member). Hence, the cell assembly for a fuel cell can be manufactured efficiently.

(4) According to a fourth aspect of the present invention, in the above configuration of (1), it is preferable that the electrode member has a stepped portion that is stepped as viewed in cross section in the thickness direction in at least a part of the peripheral edge portion, and a die-symmetric stepped portion having a shape that matches the stepped portion is produced on an inner side of the frame of the seal member preform in the preliminary production step.

According to the present configuration, the seal member preform has a die-symmetric stepped portion having a shape that matches the stepped portion of the electrode member on an inner side of the frame of the seal member preform. Hence, the seal member preform can be disposed along the shape of the peripheral edge portion of the electrode member without being divided. The present configuration is suitable for a case where it is difficult to produce the seal member preform in a divided manner because, for example, the seal member is so thin.

According to the present configuration, the electrode member can be positioned easily by just placing the electrode member in the frame of the seal member preform such that the die-symmetric stepped portion of the seal member preform and the stepped portion of the electrode member are in contact with each other in the member arrangement step. Hence, according to the present configuration, the cell assembly for a fuel cell can be manufactured efficiently.

(5) According to a fifth aspect of the present invention, in the above configuration of (1), it is preferable that the forming die further includes a base die having a concave portion that houses the pressing member in such a manner that the pressing member can be projected, and an elastic member interposed between the pressing member and a bottom surface of the concave portion to elastically support the pressing member, and the pressing member presses the other side of the electrode member in the thickness direction utilizing an elastic force of the elastic member during closing of the forming die in the member arrangement step.

It is necessary to adjust the pressing force for closing the die such that the electrode member will not be deformed or damaged. According to the present configuration, a desired pressing force can be easily obtained.

(6) According to a sixth aspect of the present invention, in the above configuration of (5), it is preferable that the elastic member is a spring member.

The spring member is relatively inexpensive and easily available. A desired pressing force can be easily obtained by adjusting the spring constant of the spring member, the compression amount in a state where the die is closed compared to that in a state where the die is open, and so forth.

(7) According to a seventh aspect of the present invention, in the above configuration of (1), it is preferable that among the pair of porous layers disposed on both sides of the membrane electrode assembly in the thickness direction, the porous layer disposed on one side of the membrane electrode assembly in the thickness direction has at least one of a gas diffusion layer and a gas flow path layer whose porosity or average pore diameter is larger than that of the gas diffusion layer, and the porous layer disposed on the other side of the membrane electrode assembly in the thickness direction has at least one of a gas diffusion layer and a gas flow path layer whose porosity or average pore diameter is larger than that of the gas diffusion layer.

The structures of the respective porous layers disposed on both sides of the membrane electrode assembly (MEA) in the thickness direction may be identical to or different from each other. According to the present configuration, the pair of porous layers have at least one of a gas diffusion layer and a gas flow path layer. The gas diffusion layer serves to spread supplied gas in the thickness direction and supply gas to the entire surface of the adjacent electrode catalyst layer. Meanwhile, the gas flow path layer serves to supply gas delivered via the adjacent separator to the MEA or the gas diffusion layer. In other words, the gas flow path layer mainly serves to guide gas in a predetermined direction. Therefore, in order to decrease the pressure loss of the gas flow and increase drainage, the porosity of the gas flow path layer is larger than that of the gas diffusion layer. Alternatively, the average pore diameter of the gas flow path layer is larger than that of the gas diffusion layer. The average pore diameter is the average diameter of a number of pores. For example, by structuring the porous layer from two layers having different porosities or average pore diameters, gas can be evenly supplied to all of one or the other side of the MEA in the thickness direction.

(8) According to a eighth aspect of the present invention, in the above configuration of (1), it is preferable that the pair of porous layers disposed on both sides of the membrane electrode assembly in the thickness direction have the gas diffusion layer respectively, and an area of the membrane electrode assembly is larger than an area of at least one gas diffusion layer According to the present configuration, the leakage of gas from the end side of one of the gas diffusion layers to the end side of the other gas diffusion layer is suppressed by the seal member, which has impregnated both end sides of the gas diffusion layers. However, even in a case where the seal member does not sufficiently impregnate and there is gas leaking from the end side of one of the gas diffusion layers, if the area of the MEA is large as in the present configuration, then the seal member coating the MEA and the peripheral edge portion thereof becomes a barrier and can reliably prevent gas from leaking to the end side of the other gas diffusion layer.

(9) According to a ninth aspect of the present invention, in the above configuration of (1), it is preferable that the solid rubber includes one or more rubber components selected from a group consisting of ethylene-propylene rubber, ethylene-propylene-diene rubber, acrylonitrile-butadiene rubber, hydrogenated acrylonitrile-butadiene rubber, styrene-butadiene rubber, and butadiene rubber.

According to the present configuration, a tensile product of the solid rubber is large. A larger tensile product indicates that more energy is required to break. As a consequence, the sealed regions have good durability.

(10) According to a tenth aspect of the present invention, in the above configuration of (1), it is preferable that the uncrosslinked item of solid rubber includes the following contents of (A) to (D): (A) at least one rubber component selected from a group consisting of ethylene-propylene rubber, ethylene-propylene-diene rubber, acrylonitrile-butadiene rubber, and hydrogenated acrylonitrile-butadiene rubber; (B) a crosslinking agent selected from organic peroxides of which a 1-hour half-life period temperature is lower than or equal to 130° C.; (C) a crosslinking auxiliary agent; and (D) an adhesive component formed of at least one of a resorcinol compound together with a melamine compound and a silane coupling agent.

A rubber in which the uncrosslinked item including the contents of the above (A) to (D) is made to crosslink has low gas permeability. Thus according to the present configuration, the sealability of the seal member can be increased. In addition, organic peroxides of which a 1-hour half-life period temperature is lower than or equal to 130° C. are used as a crosslinking agent in the present configuration (the above (B)). Here, the term "half-life period" is a time until the concentration of the organic peroxide becomes half an initial value. Accordingly, the term "half-life period temperature" is indicative of the decomposition temperature of the organic peroxide. The term "1-hour half-life period" is the temperature when the half-life period is 1 hour. In other words, a lower 1-hour half-life period indicates a greater tendency toward decomposition at low temperatures. By using an organic peroxide whose 1-hour half-life period temperature is lower than or equal to 130° C., crosslinking can be achieved at a lower temperature (i.e., lower than or equal to 130° C.) and in a shorter period. Therefore, deterioration of the electrolyte membrane due to heating during molding (crosslinking) can also be suppressed. The crosslinking agent of (B) is not prone to curing defects caused by impurities, contamination, and the like. Therefore, the crosslinking agent of (B) is resistant to the effects of the surrounding environment during operations and easy to handle.

If a resorcinol compound and a melamine compound are used in the adhesive component of (D), then the melamine compound is the methylene donor and the resorcinol compound is the methylene recipient. During crosslinking, chemical bonds are formed between the resorcinol compound, and the rubber component and a mating member, due to the donation of a methylene group. Whereby, the rubber component and the mating member are adhered. If a silane coupling agent is used in the adhesive component of (D), then chemical bonds are formed between the rubber component and the mating member via the silane coupling agent, whereby both are adhered together. A high adhesion force is achieved due to these adhesive components, and the adhesion force is not prone to decreasing even in the operation environment of a fuel cell. Accordingly, good sealability can be secured even when the fuel cell is operated for a long period. In other words, the operation reliability of the fuel cell is improved.

(11) According to a eleventh aspect of the present invention, in the above configuration of (1), it is preferable that a lateral side of the separator is coated by the seal member.

According to the present configuration, the seal member protects the peripheral edge portion of the cell assembly which includes the lateral side of the separator. Consequently, in the fuel cell in which the cell assemblies are stacked, a short circuit between the cell assemblies can be prevented even in the case where the cell assemblies are warped or the like by, for example, an external force.

(12) An twelfth aspect of the present invention provides a manufacturing method of a fuel cell, including the step of stacking a plurality of the cell assemblies for a fuel cell produced in accordance with the manufacturing method of a cell assembly for a fuel cell according to the above configuration of (1) in the thickness direction of the electrode member to produce a fuel cell.

In the cell assembly for a fuel cell manufactured in accordance with the manufacturing method of the present invention described above, the electrode member and the separator are integrated with each other by the seal member. Therefore, the fuel cell can be easily assembled by stacking mainly the cell assemblies for a fuel cell. Consequently, according to the manufacturing method of a fuel cell of the present embodiment, the fuel cell can be produced with improved efficiency.

Advantageous Effects of Invention

According to the present invention, a cell assembly for a fuel cell in which an electrode member and a separator are integrated with each other by a seal member can be manufactured conveniently and in a short time without using liquid rubber. Also, a fuel cell can be manufactured conveniently using the manufactured cell assemblies.

DESCRIPTION OF EMBODIMENTS

A manufacturing method of a cell assembly for a fuel cell and a manufacturing method of a fuel cell according to embodiments of the present invention will be described below.

First Embodiment

[Configuration of Fuel Cell]

Figure 1:
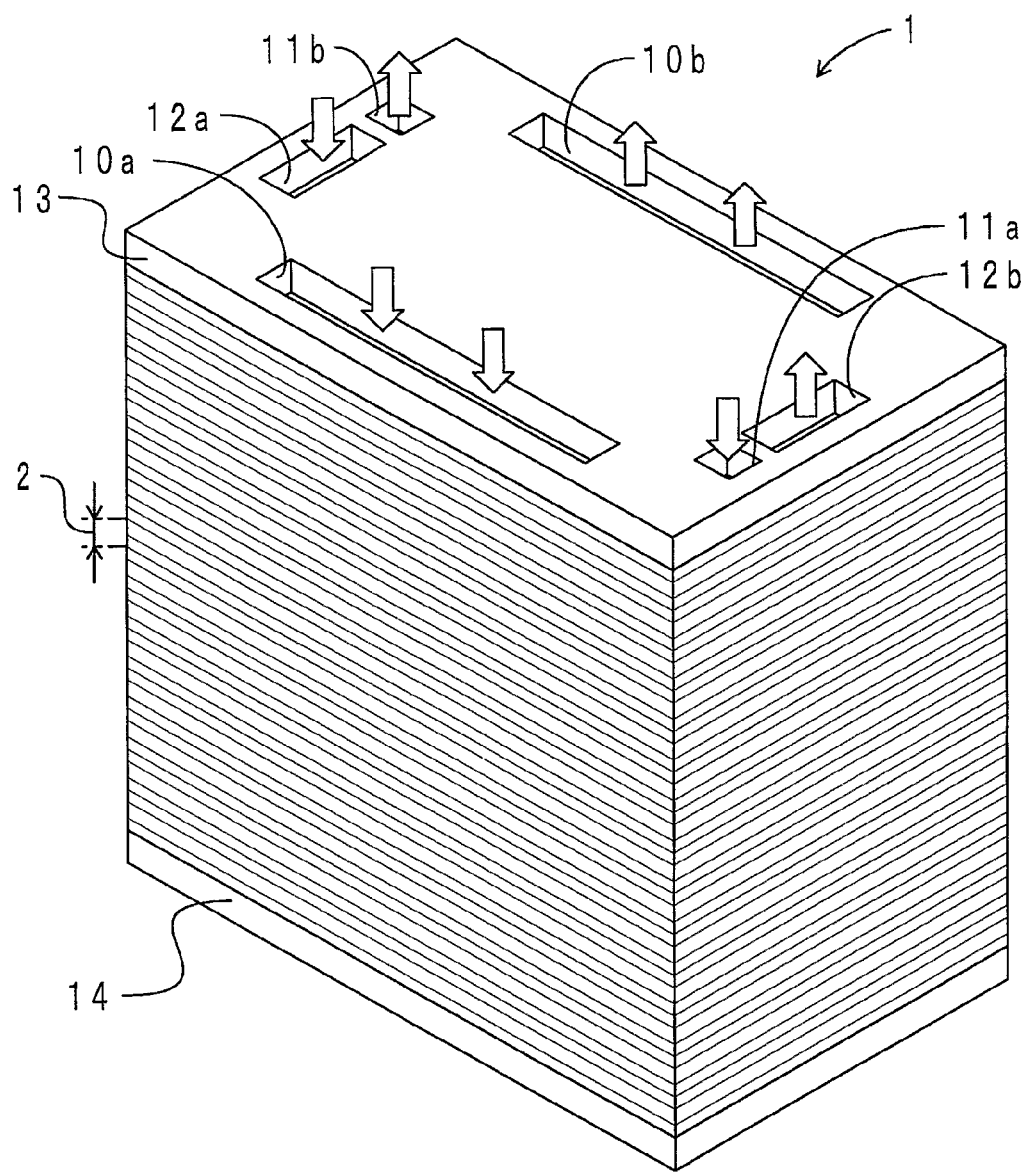
FIG. 1 is a perspective view of a fuel cell including a cell assembly for a fuel cell manufactured in accordance with a manufacturing method of a cell assembly for a fuel cell according to a first embodiment.

First, the configuration of a fuel cell including a cell assembly for a fuel cell manufactured in accordance with the manufacturing method of a cell assembly for a fuel cell according to the present embodiment will be described. FIG. 1 is a perspective view of a fuel cell including a cell assembly for a fuel cell manufactured in accordance with the manufacturing method of a cell assembly for a fuel cell according to the present embodiment. As shown in FIG. 1, a fuel cell 1 is structured by stacking a plurality of cell assemblies 2. The fuel cell 1 is a proton-exchange membrane fuel cell. A pair of end plates 13, 14 are respectively disposed on both ends of the cell assemblies 2 in the stacking direction. The pair of end plates 13, 14 are made of stainless steel, and have a rectangular plate shape. Formed along the four sides of the end plate 13 are an air supply hole 10a that supplies air (oxidizing gas), an air discharge hole 10b that discharges air, a hydrogen supply hole 11a that supplies hydrogen (fuel gas), a hydrogen discharge hole 11b that discharges hydrogen, a coolant supply hole 12a that supplies coolant, and a coolant discharge hole 12b that discharges coolant. The cell assemblies 2 are also formed with a plurality of through holes described later that correspond to the holes 10a, 10b, 11a, 11b, 12a, 12b. Accordingly, flow paths for air, hydrogen, and coolant are respectively provided penetrating in the stacking direction of the cell assemblies 2 of the fuel cell 1.

[Configuration of Cell Assembly for Fuel Cell]

Figure 2:
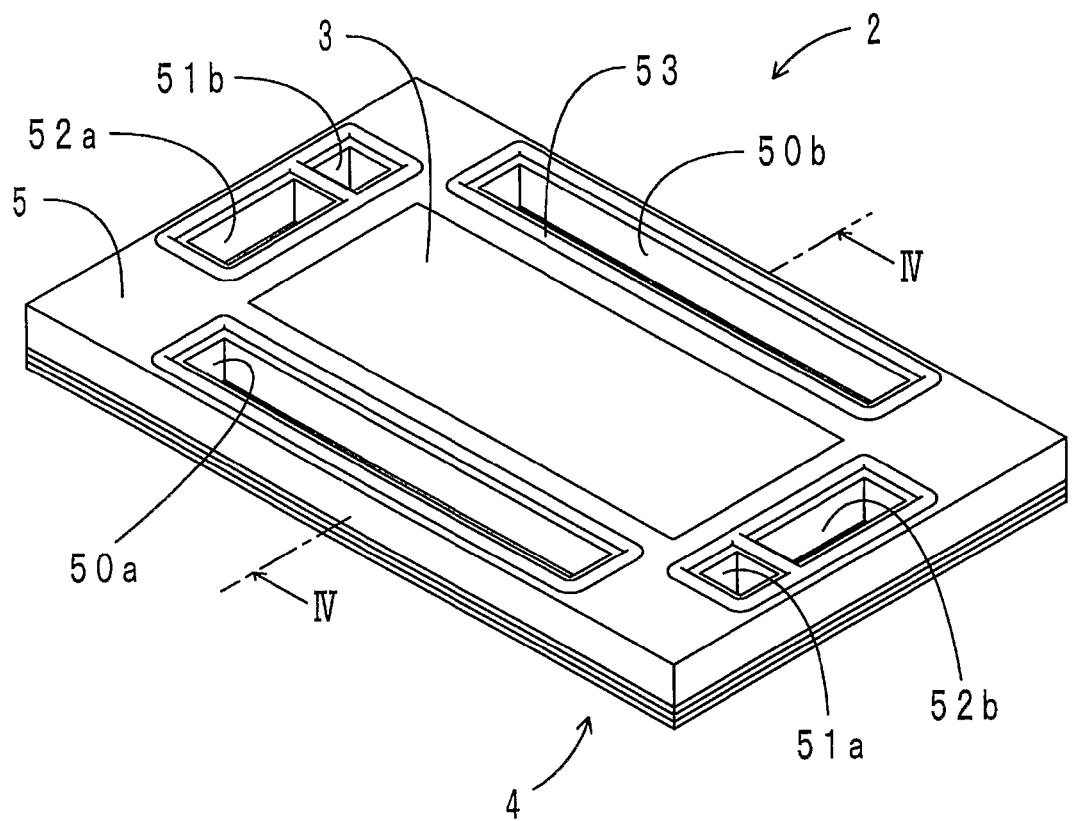
FIG. 2 is a perspective view of the cell assembly.
Figure 3:
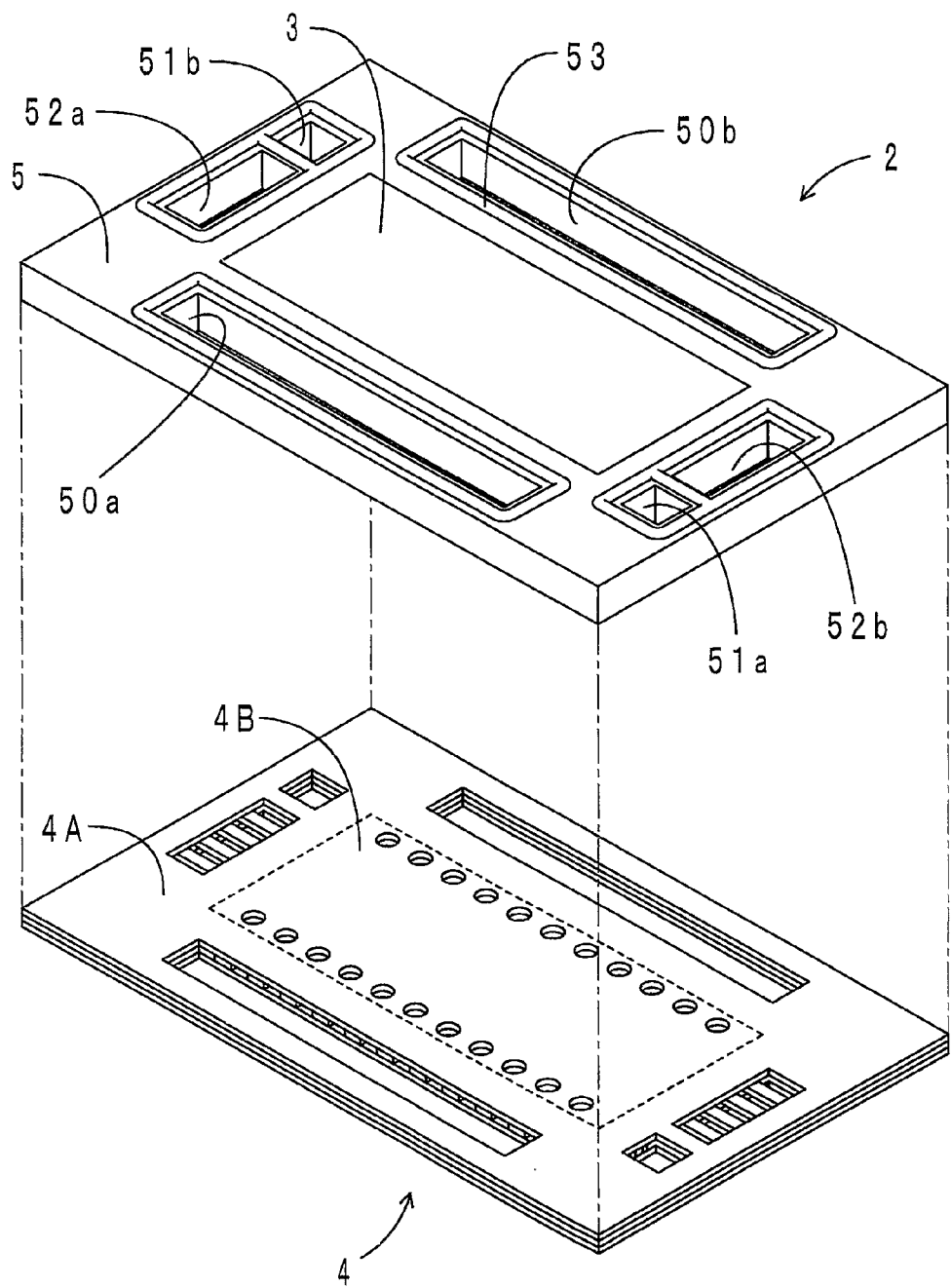
FIG. 3 is an exploded perspective view of the cell assembly.
Figure 4:
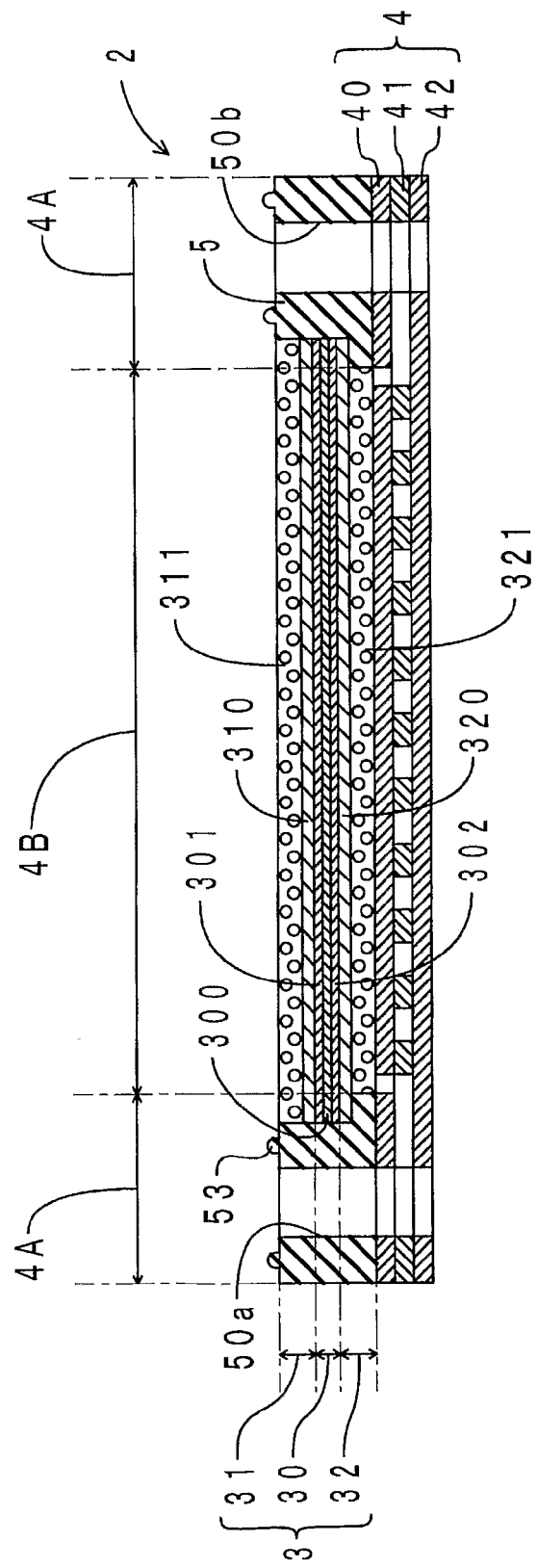
FIG. 4 is a IV-IV cross-sectional view of FIG. 2.

The configuration of a cell assembly for a fuel cell manufactured in accordance with the manufacturing method of a cell assembly for a fuel cell according to the present embodiment will be described next. FIG. 2 is a perspective view of a cell assembly manufactured in accordance with the manufacturing method of a cell assembly for a fuel cell according to the present embodiment. FIG. 3 is an exploded perspective view of the cell assembly. FIG. 4 is a Iv-Iv cross-sectional view of FIG. 2. As shown in FIGS. 2 to 4, the cell assembly 2 includes an electrode member 3, a separator 4, and a seal member 5.

The electrode member 3 includes an MEA 30, an anode porous layer 31, and a cathode porous layer 32. The MEA 30 is formed from an electrolyte membrane 300, an anode catalyst layer 301, and a cathode catalyst layer 302.

The electrolyte membrane 300 is a perfluorosulfonic acid film, and has a thin rectangular plate shape. The anode catalyst layer 301 has a thin rectangular plate shape, and is disposed to cover the top side of the electrolyte membrane 300. The anode catalyst layer 301 contains carbon particles that carry platinum. The cathode catalyst layer 302 has the same structure as the anode catalyst layer 301, and is disposed to cover the bottom side of the electrolyte membrane 300.

The anode porous layer 31 includes a gas diffusion layer 310 and a gas flow path layer 311. The gas diffusion layer 310 is made of carbon paper, and has a thin rectangular plate shape. The gas diffusion layer 310 is disposed on the top side of the anode catalyst layer 301 of the MEA 30. The porosity of the gas diffusion layer 310 is approximately 60%. The gas flow path layer 311 is made of sintered foam metal, and has a thin rectangular plate shape. The gas flow path layer 311 is disposed on the top side of the gas diffusion layer 310. The porosity of the gas flow path layer 311 is approximately 70 to 80%. The shape and area of the gas diffusion layer 310 and the shape and area of the gas flow path layer 311 are identical to the shape and area of the MEA 30. Therefore, the peripheral edge portions of the gas diffusion layer 310 and the gas flow path layer 311 are aligned with the peripheral edge portion of the MEA 30 as viewed from above.

The cathode porous layer 32 includes a gas diffusion layer 320 and a gas flow path layer 321. The gas diffusion layer 320 has the same structure as the gas diffusion layer 310, and is disposed on the bottom side of the cathode catalyst layer 302 of the MEA 30. The shape and area of the gas diffusion layer 320 are identical to the shape and area of the MEA 30. Hence, the peripheral edge portion of the gas diffusion layer 320 is disposed in flush with the peripheral edge portion of the MEA 30. The gas flow path layer 321 has the same structure as the gas flow path layer 311, and is disposed on the bottom side of the gas diffusion layer 320. The gas flow path layer 321 has a generally similar shape to the MEA 30. The area of the gas flow path layer 321 is smaller than the area of the MBA 30. Therefore, the peripheral edge portion of the gas flow path layer 321 is disposed more inward than the peripheral edge portion of the MEA 30.

The separator 4 has a rectangular plate shape, and is arranged to be stacked below the electrode member 3. The separator 4 is formed by stacking a cathode plate 40, an intermediate plate 41, and an anode plate 42 in this order from the top. The cathode plate 40 is made of stainless steel, and is disposed to contact the bottom side of the gas flow path layer 321. The anode plate 42 is in contact with the top side of another cell assembly (not shown) that is stacked below the cell assembly 2. The respective plates 40, 41, 42 structuring the separator 4 are each formed with a plurality of through holes. Accordingly, flow paths for air, hydrogen, and coolant are formed inside the separator 4.

As shown in FIGS. 3 and 4, a seal member arrangement portion 4A and an electrode member arrangement portion 4B are defined on the top side of the cathode plate 40. The electrode member arrangement portion 4B has a rectangular shape. The seal member arrangement portion 4A has a rectangular frame shape. The seal member arrangement portion 4A is disposed on the outer side of the electrode member arrangement portion 4B in the planar direction (horizontal direction). The gas flow path layer 321 is disposed in the electrode member arrangement portion 4B.

The seal member 5 has a rectangular frame shape, and is disposed in the seal member arrangement portion 4A of the separator 4. The seal member 5 is formed from a crosslinked item of solid rubber containing ethylene-propylene-diene rubber (EPDM) as a rubber component. The seal member 5 coats the peripheral edge portion of the electrode member 3, and is bonded to the cathode plate 40 of the separator 4. Through holes 50a, 50b, 51a, 51b, 52a, 52b are formed along the four sides of the seal member 5. The through hole 50a corresponds to the air supply hole 10a, the through hole 50b corresponds to the air discharge hole 10b, the through hole 51a corresponds to the hydrogen supply hole 11a, the through hole 51b corresponds to the hydrogen discharge hole 11b, the through hole 52a corresponds to the coolant supply hole 12a, and the through hole 52b corresponds to the coolant discharge hole 12b. A convex portion 53 is formed on the top side of the seal member 5 so as to surround the respective through holes 50a, 50b, 51a, 51b, 52a, 52b. During assembly of the fuel cell 1 by stacking the cell assemblies 2, the convex portion 53 is pressed and deformed by a fastening force in the stacking direction. Accordingly, a seal line is formed around the respective through holes 50a, 50b, 51a, 51b, 52a, 52b, which suppresses the leakage of air, hydrogen, and coolant.

[Manufacturing Method of Cell Assembly for Fuel Cell]

The manufacturing method of a cell assembly for a fuel cell according to the present embodiment will be described next. The manufacturing method of a cell assembly for a fuel cell according to the present embodiment includes a preliminary production step, a member arrangement step, and an integration step.

Figure 5:
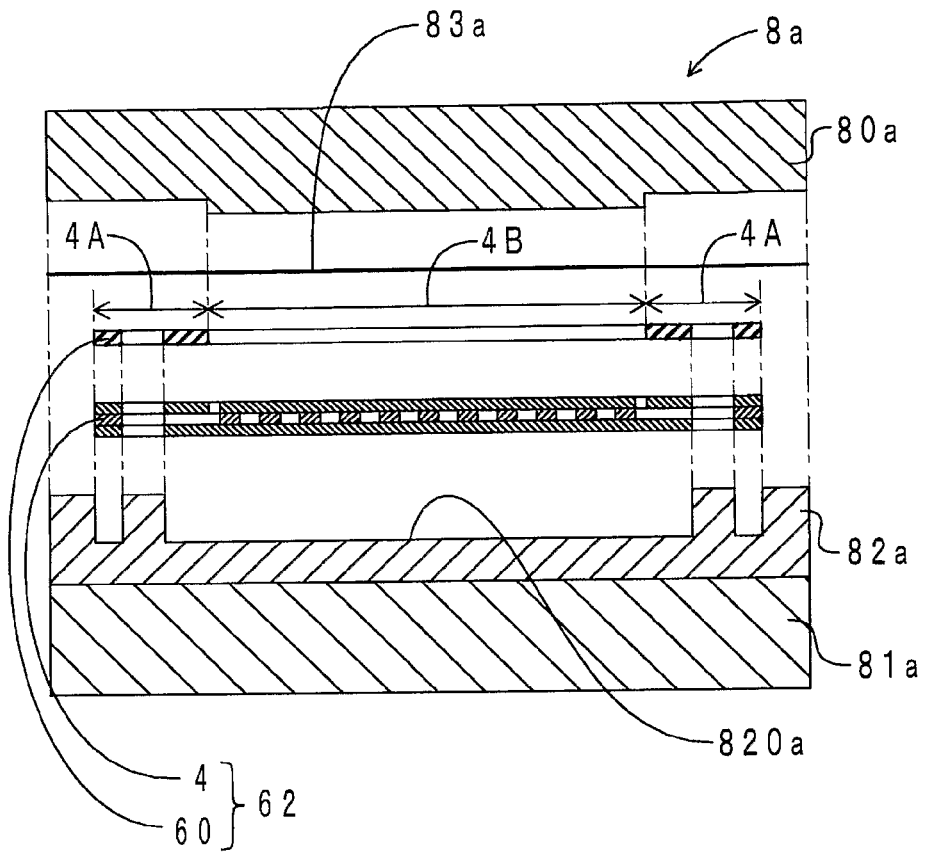
FIG. 5 is a cross-sectional view of a preforming die for use to produce a first temporary assembly in an open state.
Figure 6:
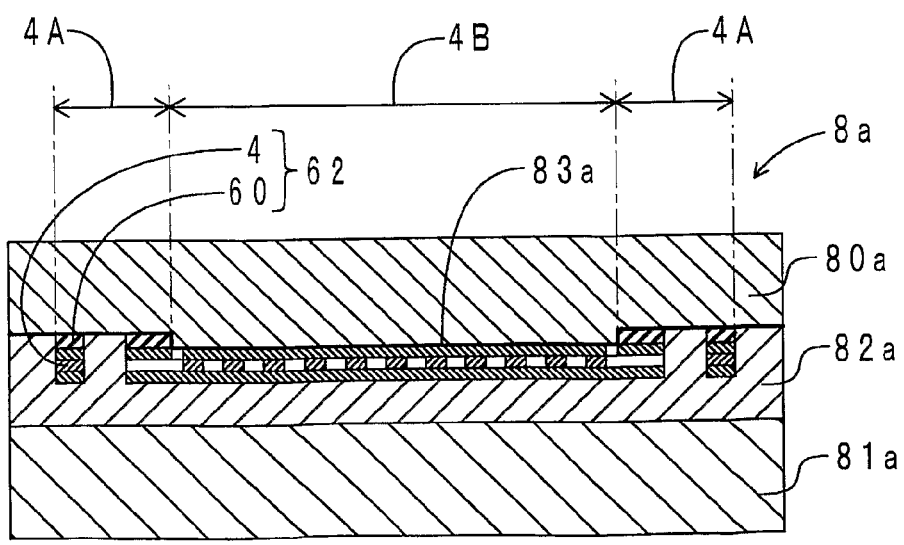
FIG. 6 is a cross-sectional view of the preforming die in a closed state.
Figure 7:
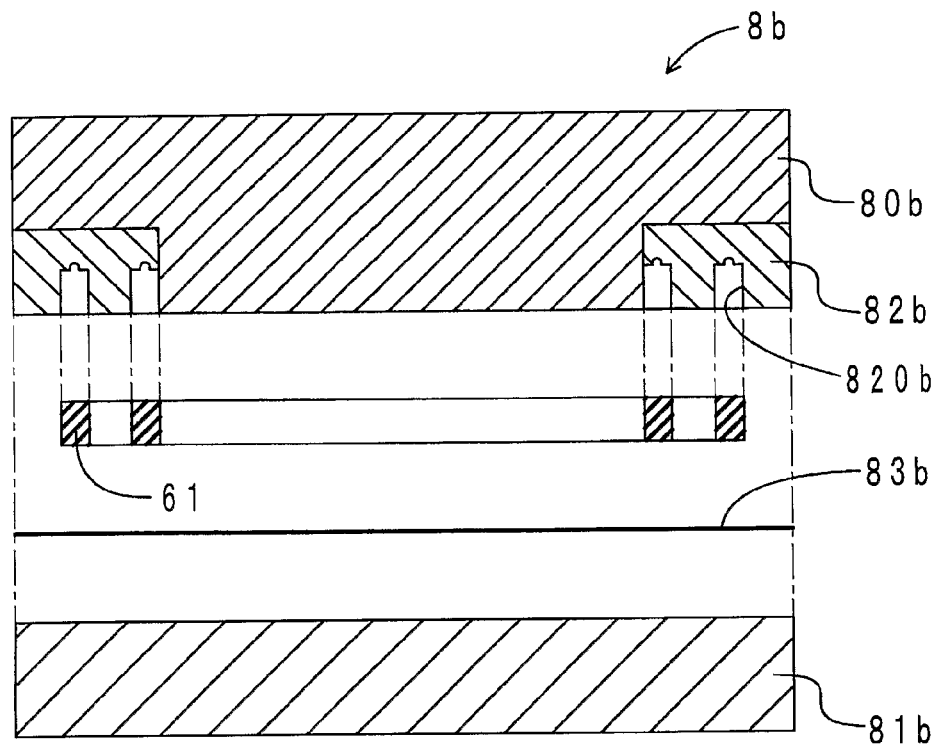
FIG. 7 is a cross-sectional view of a preforming die for use to produce a second divided body in an open state.
Figure 8:
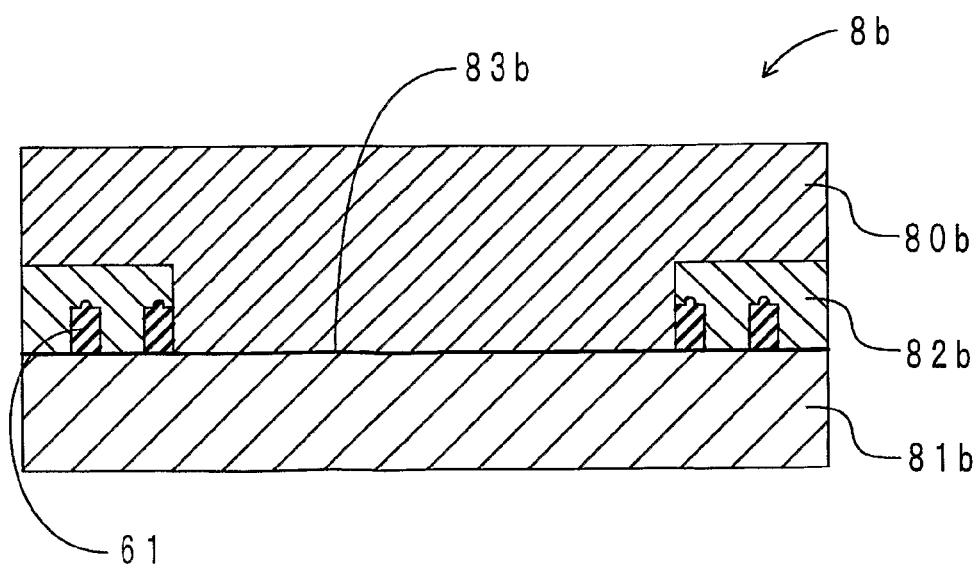
FIG. 8 is a cross-sectional view of the preforming die in a closed state.
Figure 9:
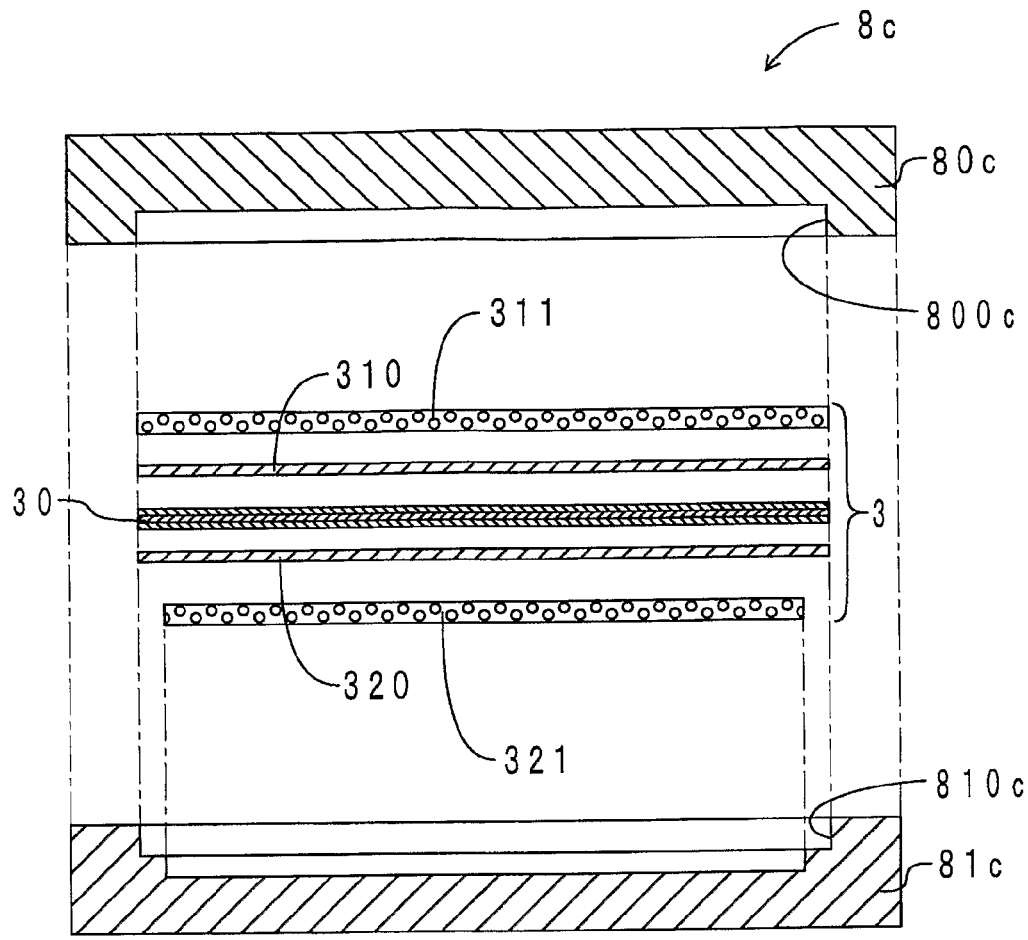
FIG. 9 is a cross-sectional view of a preforming die for use to produce an electrode member in an open state.
Figure 10:
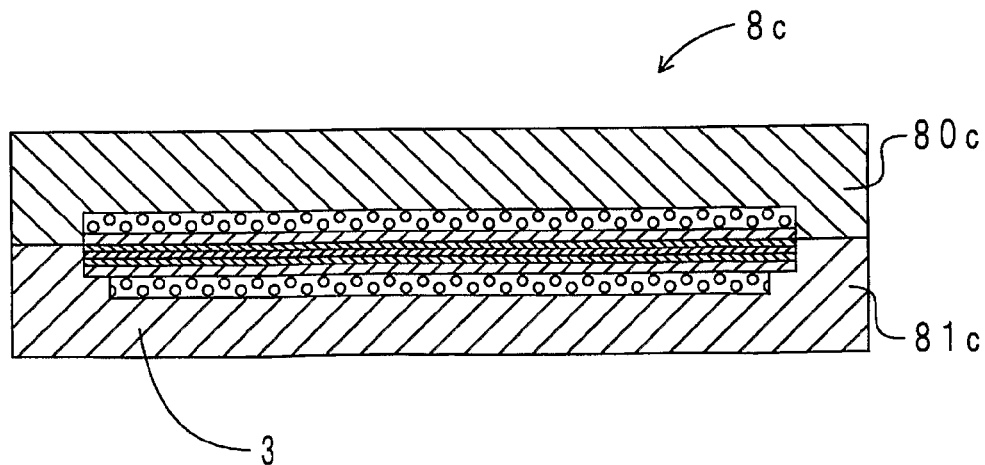
FIG. 10 is a cross-sectional view of the preforming die in a closed state.

First, the preliminary production step will be described. FIG. 5 is a cross-sectional view of a preforming die for use to produce a first temporary assembly in an open state. FIG. 6 is a cross-sectional view of the preforming die in a closed state. FIG. 7 is a cross-sectional view of a preforming die for use to produce a second divided body in an open state. FIG. 8 is a cross-sectional view of the preforming die in a closed state. FIG. 9 is a cross-sectional view of a preforming die for use to produce an electrode member in an open state. FIG. 10 is a cross-sectional view of the preforming die in a closed state.

In this step, the electrode member 3, the separator 4, and a seal member preform 6 which will become the seal member 5 after molding are produced in a predetermined shape. The seal member preform 6 is formed from a first divided body 60 (see FIG. 6) and a second divided body 61 (see FIG. 8) divided in the thickness direction. The first divided body 60 and the second divided body 61 are each formed from an uncrosslinked item of solid rubber containing EPDM as a rubber component. The first divided body 60 has the shape of a lower portion of the seal member 5 obtained by dividing the seal member 5 into upper and lower portions along the line of the top side of the gas flow path layer 321 of the electrode member 3 (see FIG. 4). The second divided body 61 has the shape of an upper portion of the seal member 5 obtained by dividing the seal member 5 into upper and lower portions along the line of the top side of the gas flow path layer 321 (see FIG. 4).

Firstly, the first divided body 60 is formed in the seal member arrangement portion 4A of the separator 4 to preform a first temporary assembly 62. As shown in FIG. 5, a preforming die 8a includes a first preforming die 80a, a second preforming die 81a, an intermediate die 82a, and a die release film 83a. The intermediate die 82a is disposed on the top side of the second preforming die 81a. A concave portion 820a that houses the separator 4 and the first divided body 60 is formed in the top side of the intermediate die 82a. The separator 4 is first disposed in the concave portion 820a of the intermediate die 82a. The first divided body 60 is subsequently disposed in the seal member arrangement portion 4A of the separator 4. After that, the die release film 83a is disposed on the top side of the first divided body 60. Thereafter, the first preforming die 80a and the intermediate die 82a and the second preforming die 81a are aligned to close the die. Subsequently, with the die closed as shown in FIG. 6, the preforming die 8a is heated to a temperature at which the first divided body 60 is not crosslinked. This allows the first divided body 60 and the separator 4 to be bonded to each other. Accordingly, the first temporary assembly 62 in which the first divided body 60 is formed in the seal member arrangement portion 4A of the separator 4 is obtained. After the first preforming die 80a and the second preforming die 81a are removed, the first temporary assembly 62 which is housed in the intermediate die 82a is used in the subsequent member arrangement step.

Secondly, the second divided body 61 is preformed. The second divided body 61 is incorporated with the first divided body 60 to form the seal member preform 6. As shown in FIG. 7, a preforming die 8b includes a first preforming die 80b, a second preforming die 81b, an intermediate die 82b, and a die release film 83b. The intermediate die 82b is mounted around a convex portion formed on the bottom side of the first preforming die 80b. A concave portion 820b die-symmetric with respect to the second divided body 61 is formed in the bottom side of the intermediate die 82b. The die release film 83b is first disposed on the top side of the second preforming die 81b. An uncrosslinked item of solid rubber which is a molding material of the second divided body 61 is disposed on the top side of the die release film 83b. After that, the first preforming die 80b and the intermediate die 82b and the second preforming die 81b are aligned to close the die. Thereafter, with the die closed as shown in FIG. 8, the preforming die 8b is heated to obtain the second divided body 61. After the first preforming die 80b and the second preforming die 81b are removed, the second divided body 61 is used in the subsequent member arrangement step together with the intermediate die 82b.

Thirdly, the electrode member 3 is produced. As shown in FIG. 9, a preforming die 8c includes a first preforming die 80c and a second preforming die 81c. A concave portion 800c is formed in the bottom side of the first preforming die 80c. Similarly, a concave portion 810c is formed in the top side of the second preforming die 81c. The gas flow path layer 321, the gas diffusion layer 320, the MEA 30, the gas diffusion layer 310, and the gas flow path layer 311 are first arranged to be stacked in the concave portion 810c of the second preforming die 81c in this order from the bottom. The first preforming die 80c and the second preforming die 81c are subsequently aligned to close the die. After that, with the die closed as shown in FIG. 10, the preforming die 8c is heated. Thereafter, the die is removed to obtain the electrode member 3.

Figure 11:
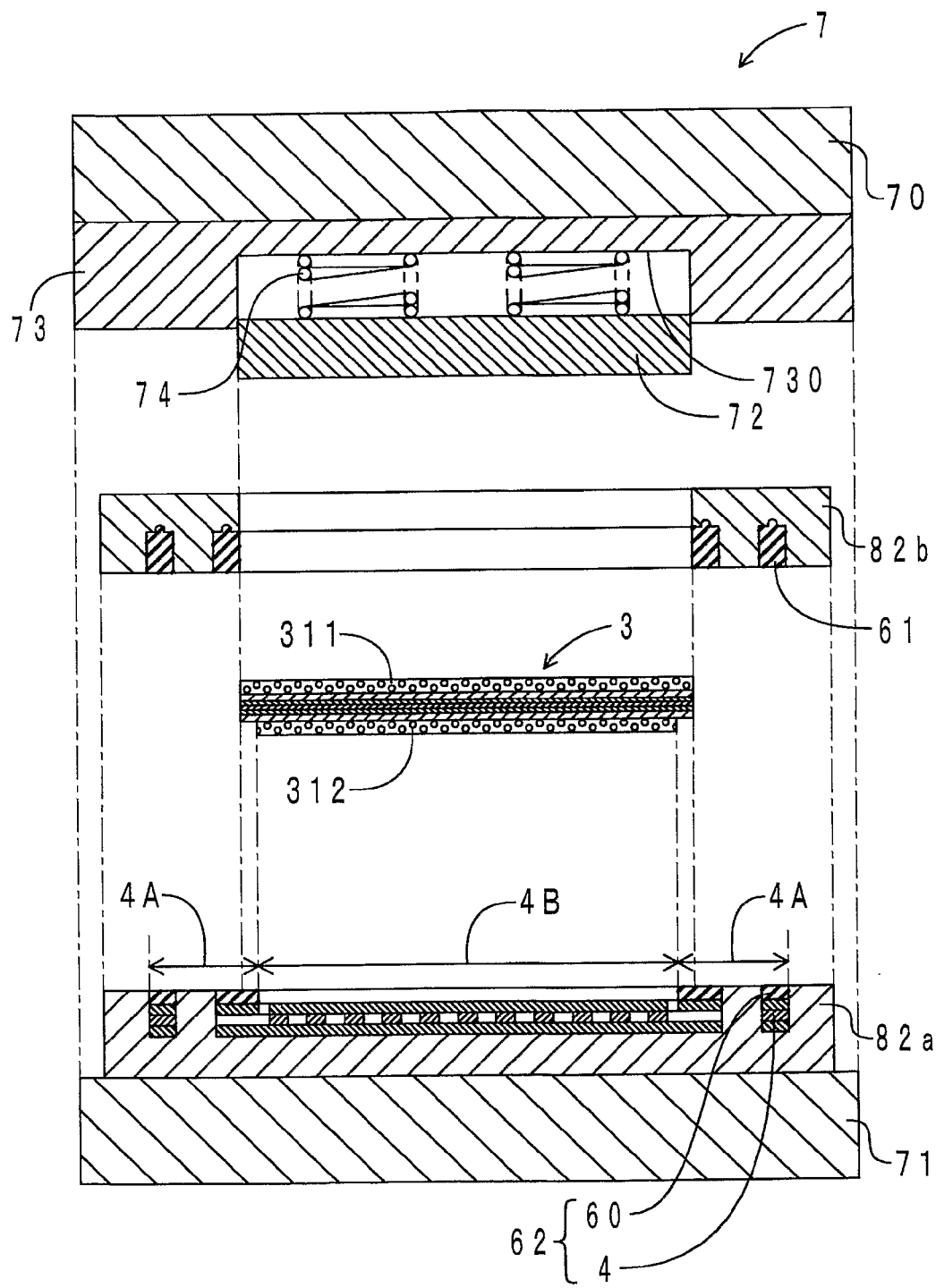
FIG. 11 is a cross-sectional view of a forming die for use in the manufacturing method of a cell assembly for a fuel cell according to the first embodiment in an open state.
Figure 12:
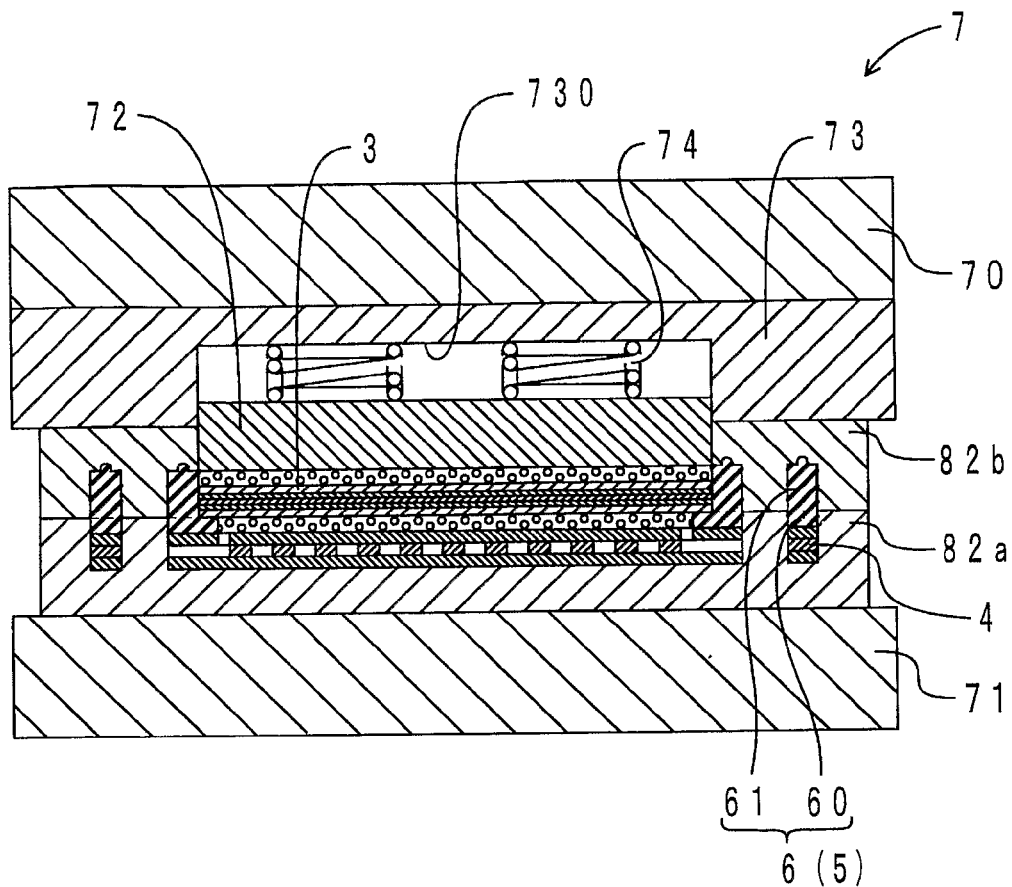
FIG. 12 is a cross-sectional view of the forming die in a closed state.

The member arrangement step will be described next. FIG. 11 is a cross-sectional view of a forming die in an open state. FIG. 12 is a cross-sectional view of the forming die in a closed state.

In this step, the respective structural elements produced in the preceding step (preliminary production step) are disposed in a forming die 7. As shown in FIG. 11, the forming die 7 includes a first forming die 70, a second forming die 71, a pressing member 72, and a base die 73. The base die 73 is integrally disposed on the bottom side of the first forming die 70. A concave portion 730 that can house the pressing member 72 is formed in the bottom side of the base die 73. A pair of spring members 74 are disposed on the bottom surface of the concave portion 730. The spring members 74 can expand and contract in the up-down direction. The pressing member 72 is made of stainless steel, and has the shape of a rectangular parallelepiped. The pressing member 72 is elastically supported by the spring members 74.

The intermediate die 82a in which the first temporary assembly 62 is housed is first disposed on the top side of the second forming die 71. The electrode member 3 is subsequently disposed on the top side of the first temporary assembly 62 such that the gas flow path layer 321 is housed in the frame of the first divided body 60. The intermediate die 82b in which the second divided body 61 is housed is next disposed on the top side of the intermediate die 82a such that the first divided body 60 and the second divided body 61 are incorporated with each other. Thereafter, the first forming die 70 and the second forming die 71 are aligned to close the die. With the die closed as shown in FIG. 12, the first divided body 60 and the second divided body 61 are incorporated with each other to form the seal member preform 6. The peripheral edge portion of the electrode member 3 is coated by the seal member preform 6. The top side of the gas flow path layer 311 of the electrode member 3 is pressed by the pressing member 72 from above. That is, the electrode member 3 is pressed against the top side of the separator 4 by the pressing member 72 with a predetermined pressing force.

The integration step will be described next. In this step, the forming die 7 is heated with the die kept closed. As a result of the heating, the seal member preform 6 is crosslinked to become the seal member 5. Moreover, the electrode member 3 and the separator 4 are integrated with each other via the seal member 5.

[Manufacturing Method of Fuel Cell]

The manufacturing method of a fuel cell according to the present embodiment will be described next with reference to FIG. 1 mentioned earlier. A predetermined number of cell assemblies 2 are first stacked in the thickness direction of the electrode member 3. End plates 13, 14 are next respectively disposed on both ends in the stacking direction. The end plates 13, 14 are fastened to the stacked cell assemblies 2 by applying a predetermined fastening force from both sides in the stacking direction to obtain the fuel cell 1.

[Operations and Effects]

The operations and effects of the manufacturing method of a cell assembly for a fuel cell and the manufacturing method of a fuel cell according to the present embodiment will be described below. According to the manufacturing method of a cell assembly of the present embodiment, the seal member 5 in the cell assembly 2 is formed from a crosslinked item of solid rubber containing EPDM as a rubber component. Since solid rubber is used, the seal member preform 6 which is formed from an uncrosslinked item of solid rubber can be produced in a predetermined shape in advance. Consequently, the cell assembly 2 can be produced conveniently and in a short time by disposing the seal member preform 6, which is obtained by incorporating the first temporary assembly 62 and the second divided body 61 with each other, and the separator 4 in the forming die 7 together with the electrode member 3 and performing integral molding. Since solid rubber is used, no issues are caused that would occur in the case where injection molding was performed using liquid rubber. That is, according to the manufacturing method of a cell assembly of the present embodiment, there is no need for special treatment for regulating the amount of liquid rubber for impregnation. Furthermore, there is no risk of the electrolyte membrane 300 being deformed by the injection pressure of liquid rubber.

The seal member 5 has high tensile strength and elongation. Consequently, the seal member 5 easily follows the expansion and contraction of the electrolyte membrane 300, and has high durability. Even without the use of an adhesive agent, the seal member 5, the electrode member 3, and the separator 4 can be strongly bonded to each other. Further, the seal member 5 is not prone to lose its adhesiveness even in the operation environment of the fuel cell 1. Therefore, the seal member 5 secures good sealability during operation. Thus, according to the manufacturing method of a fuel cell of the present embodiment, the fuel cell 1 which operates stably over a long period can be manufactured.

According to the manufacturing method of a cell assembly of the present embodiment, the seal member preform 6 is formed from the first divided body 60 and the second divided body 61. Since the seal member preform 6 is structured by two divided bodies, the seal member preform 6 can be easily produced to match the shape of the peripheral edge portion of the electrode member 3.

The seal member preform 6 is formed from an uncrosslinked item of solid rubber having adhesiveness. Therefore, the electrode member 3 can be positioned easily by producing the first temporary assembly 62 which has the first divided body 60 in the preliminary production step and disposing the electrode member 3 in the frame of the first divided body 60 in the member arrangement step.

To incorporate the first temporary assembly 62 and the second divided body 61 with each other, the second divided body 61 may be disposed using the position of the first divided body 60 as a reference. Namely, the second divided body 61 may be disposed so as to be incorporated with the first divided body 60. Thus, the manufacturing method of a cell assembly according to the present embodiment allows easy positioning of the structural elements. Hence, the cell assembly 2 can be manufactured efficiently.

According to the manufacturing method of a cell assembly of the present embodiment, the forming die 7 is closed while the pressing member 72 is pressing the top side of the electrode member 3 in the member arrangement step. Accordingly, misalignment of the electrode member 3 during molding can be suppressed. Further, warping, cracking, and so forth of the electrode member 3 can be suppressed. The pressing member 72 is supported by the spring members 74. Hence, the pressing force of the pressing member 72 can be easily adjusted by adjusting the spring constant of the spring members, the compression amount in a state where the die is closed with respect to that in a state where the die is open, and so forth.

According to the manufacturing method of a fuel cell of the present embodiment, the fuel cell 1 can be easily assembled by just stacking the cell assemblies 2. Consequently, according to the manufacturing method of a fuel cell of the present embodiment, the fuel cell 1 can be produced with improved efficiency. In addition, the cell assembly 2 can be individually taken out from the fuel cell 1 as necessary. Hence, the fuel cell 1 can be easily inspected and repaired.

Second Embodiment

The manufacturing method of a cell assembly for a fuel cell and the manufacturing method of a fuel cell according to the present embodiment are different from those according to the first embodiment in that the seal member preform is formed from an inner divided body and an outer divided body divided in the planar direction (horizontal direction). Another difference is that an inner temporary assembly in which the inner divided body is formed at the peripheral edge portion of the electrode member is produced. Accordingly, the difference will be mainly described herein.

First, the preliminary production step will be described. In this step, the electrode member 3, the separator 4, and the seal member preform 6 are produced in a predetermined shape. The production method of the electrode member 3 and the separator 4 is similar to that in the first embodiment. Thus, the description of the method is omitted herein.

The seal member preform 6 is formed from an outer divided body 63 (see FIG. 14 mentioned later) having a frame shape and an inner divided body 64 (see FIG. 13 mentioned later) having a frame shape and being smaller than the outer divided body 63, which are divided in the planar direction. The inner divided body 64 and the outer divided body 63 are each formed from an uncrosslinked item of solid rubber containing EPDM as a rubber component. The inner divided body 64 is formed at the peripheral edge portion of the electrode member 3 to preform an inner temporary assembly 65.

Figure 13:
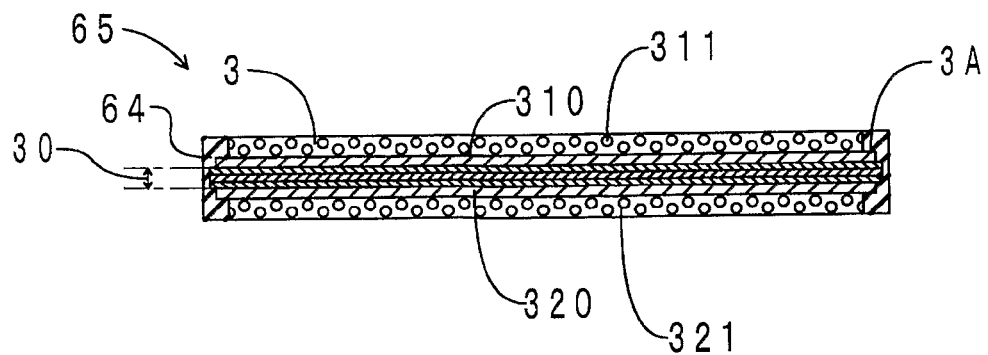
FIG. 13 is a cross-sectional view of an inner temporary assembly in a cell assembly for a fuel cell manufactured in accordance with a manufacturing method of a cell assembly for a fuel cell according to a second embodiment.

FIG. 13 is a cross-sectional view of the inner temporary assembly. As shown in FIG. 13, the inner temporary assembly 65 is formed from the electrode member 3 and the inner divided body 64. The electrode member 3 is formed from an MEA 30, a gas diffusion layer 310 and a gas flow path layer 311 (an anode porous layer), and a gas diffusion layer 320 and a gas flow path layer 321 (a cathode porous layer). The gas diffusion layer 310 has a generally similar shape to the MEA 30. The gas diffusion layer 310 is smaller than the MEA 30. Namely, the area of the gas diffusion layer 310 is smaller than the area of the MEA 30. Therefore, the peripheral edge portion of the gas diffusion layer 310 is disposed more inward than the peripheral edge portion of the MEA 30. Also, the gas flow path layer 311 has a generally similar shape to the gas diffusion layer 310. The area of the gas flow path layer 311 is smaller than the area of the gas diffusion layer 310. Therefore, the peripheral edge portion of the gas flow path layer 311 is disposed more inward than the peripheral edge portion of the gas diffusion layer 310. Similarly, the gas diffusion layer 320 has a generally similar shape to the MEA 30. The area of the gas diffusion layer 320 is smaller than the area of the MEA 30. Therefore, the peripheral edge portion of the gas diffusion layer 320 is disposed more inward than the peripheral edge portion of the MEA 30. Also, the gas flow path layer 321 has a generally similar shape to the gas diffusion layer 320. The area of the gas flow path layer 321 is smaller than the area of the gas diffusion layer 320. Therefore, the peripheral edge portion of the gas flow path layer 321 is disposed more inward than the peripheral edge portion of the gas diffusion layer 320. Thus, the electrode member 3 has a stepped portion 3A that is stepped as viewed in cross section in the thickness direction at the peripheral edge portion. The inner divided body 64 is disposed along the shape of the peripheral edge portion of the electrode member 3 (stepped portion 3A) to cover the stepped portion 3A.

Figure 14:
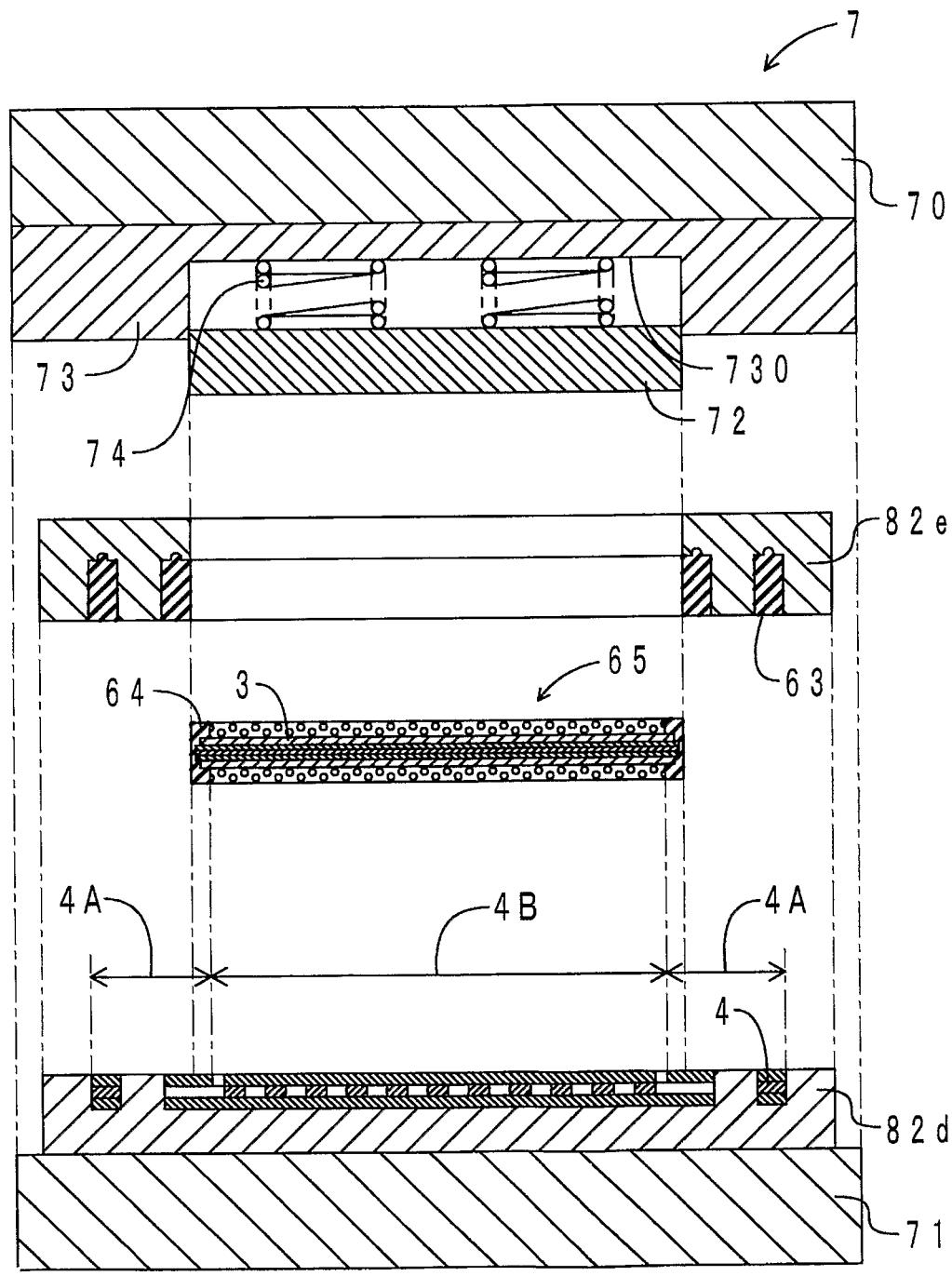
FIG. 14 is a cross-sectional view of a forming die for use in the manufacturing method in an open state.
Figure 15:
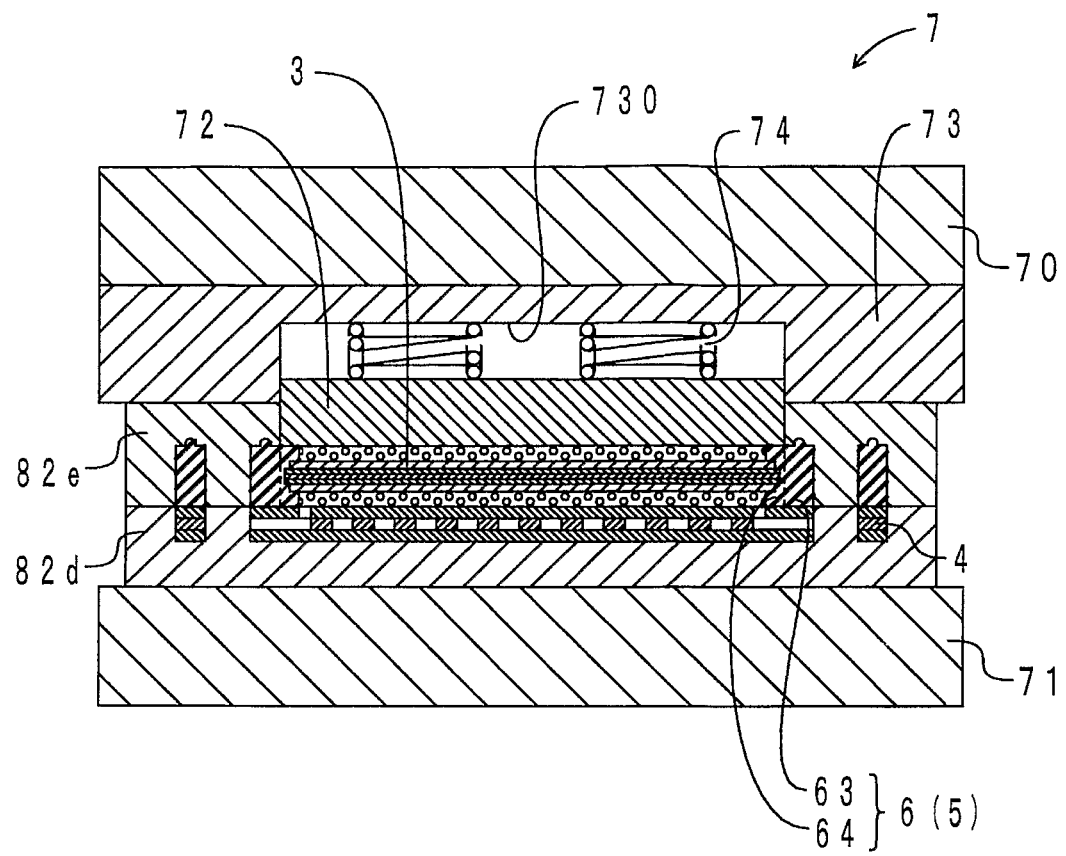
FIG. 15 is a cross-sectional view of the forming die in a closed state.

The member arrangement step will be described next. FIG. 14 is a cross-sectional view of a forming die in an open state. FIG. 15 is a cross-sectional view of the forming die in a closed state. Components in FIG. 14 corresponding to those in FIG. 11 are denoted by the same reference symbols.

In this step, the respective structural elements produced in the preceding step (preliminary production step) are disposed in a forming die 7. As shown in FIG. 14, an intermediate die 82d in which the separator 4 is housed is first disposed on the top side of the second forming die 71. The inner temporary assembly 65 is subsequently disposed on the top side of the separator 4 such that the gas flow path layer 321 of the electrode member 3 is in contact with the electrode member arrangement portion 4B. An intermediate die 82e in which the outer divided body 63 is housed is next disposed on the top side of the intermediate die 82d such that the inner divided body 64 and the outer divided body 63 are incorporated with each other. Thereafter, the first forming die 70 and the second forming die 71 are aligned to close the die. With the die closed as shown in FIG. 15, the inner divided body 64 and the outer divided body 63 are incorporated with each other to form the seal member preform 6. The peripheral edge portion of the electrode member 3 is coated by the seal member preform 6. The top side of the gas flow path layer 311 of the electrode member 3 is pressed by the pressing member 72 from above. That is, the electrode member 3 is pressed against the top side of the separator 4 by the pressing member 72 with a predetermined pressing force.

The integration step will be described next. In this step, the forming die 7 is heated with the die kept closed. As a result of the heating, the seal member preform 6 is crosslinked to become the seal member 5. Moreover, the electrode member 3 and the separator 4 are integrated with each other via the seal member 5.

The manufacturing method of a fuel cell according to the present embodiment is similar to the manufacturing method of a fuel cell according to the first embodiment. Thus, the description of the method is omitted herein.

Regarding common structures, the manufacturing method of a cell assembly for a fuel cell and the manufacturing method of a fuel cell according to the present embodiment have operations and effects similar to those of the manufacturing method of a cell assembly for a fuel cell and the manufacturing method of a fuel cell according to the first embodiment. According to the manufacturing method of a cell assembly of the present embodiment, the seal member preform 6 is formed from the inner divided body 64 and the outer divided body 63. Then, the inner divided body 64 is formed at the peripheral edge portion of the electrode member 3 to produce the inner temporary assembly 65 in the preliminary production step. Therefore, the electrode member 3 can be positioned easily by disposing the inner divided body 64 in the frame of the outer divided body 63 in the member arrangement step. Moreover, at the same time as the electrode member 3 is positioned, the inner divided body 64 of the inner temporary assembly 65 and the outer divided body 63 can be incorporated with each other. That is, the seal member preform 6 can be formed. Thus, the manufacturing method of a cell assembly according to the present embodiment allows easy positioning of the structural elements. Hence, the cell assembly 2 can be manufactured efficiently.

According to the manufacturing method of a cell assembly of the present embodiment, the area of the MEA 30 is larger than the area of the gas diffusion layer 310. Hence, even if the seal member 5 does not sufficiently coat the end portion of the gas diffusion layer 310, the MEA 30 and the seal member 5 coating the peripheral edge portion of the MEA 30 act as a barrier, which suppresses the leakage of gas to the end side of the gas diffusion layer 320.

Third Embodiment

The manufacturing method of a cell assembly for a fuel cell and the manufacturing method of a fuel cell according to the present embodiment are different from those according to the first embodiment in that the seal member preform is integrally produced to match the shape of the peripheral edge portion of the electrode member. Accordingly, the difference will be mainly described herein.

Figure 16:
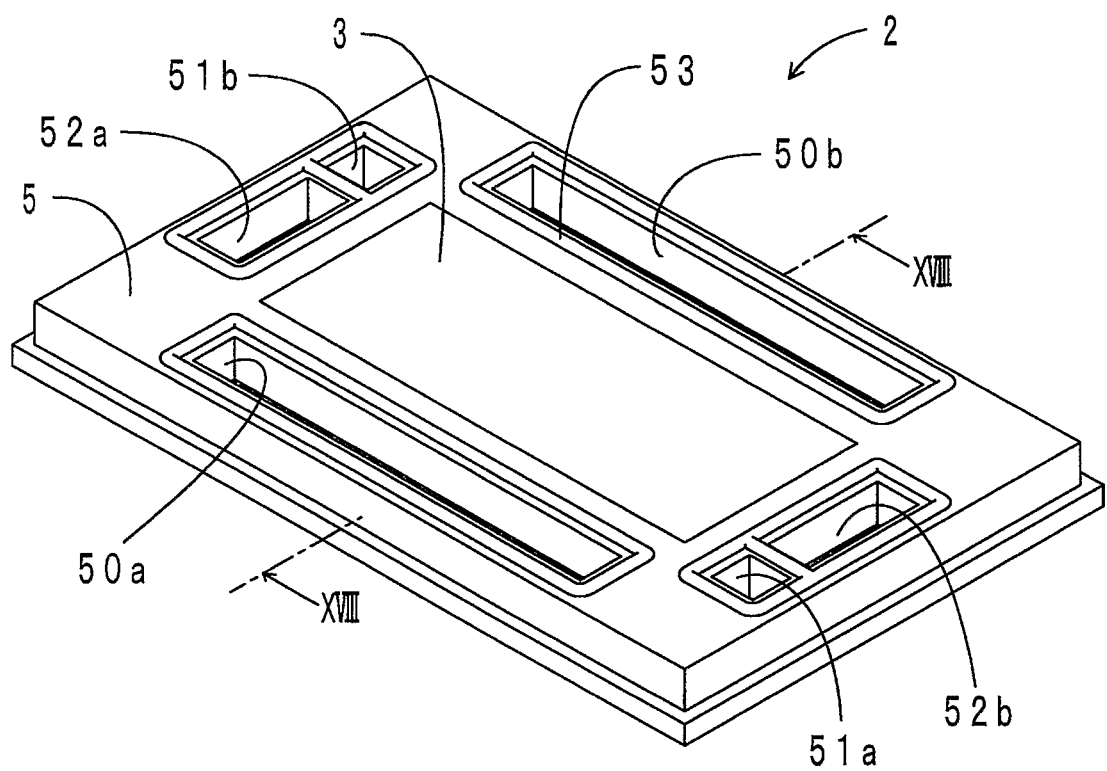
FIG. 16 is a perspective view of a cell assembly for a fuel cell manufactured in accordance with a manufacturing method of a cell assembly for a fuel cell according to a third embodiment.
Figure 17:
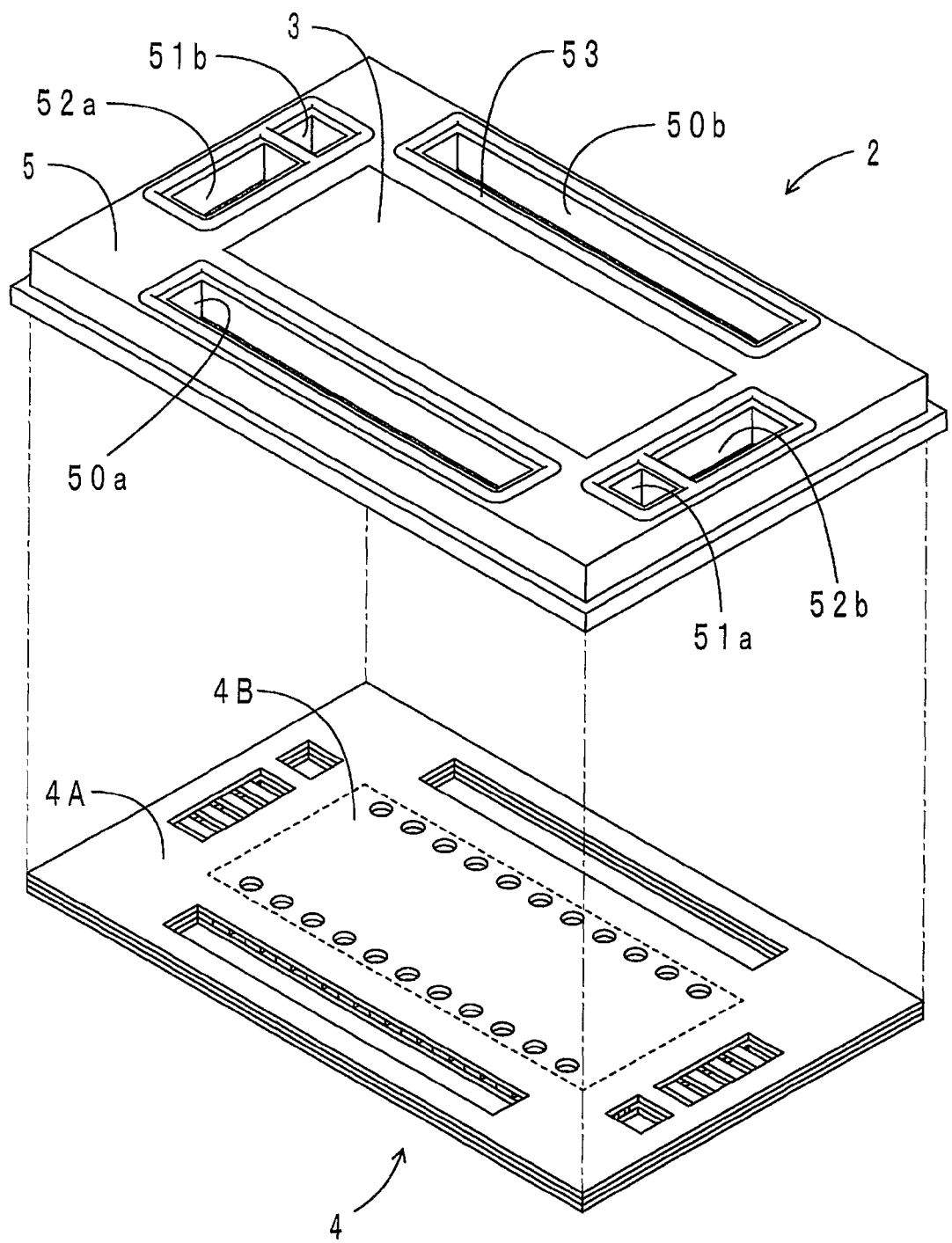
FIG. 17 is an exploded perspective view of the cell assembly.
Figure 18:
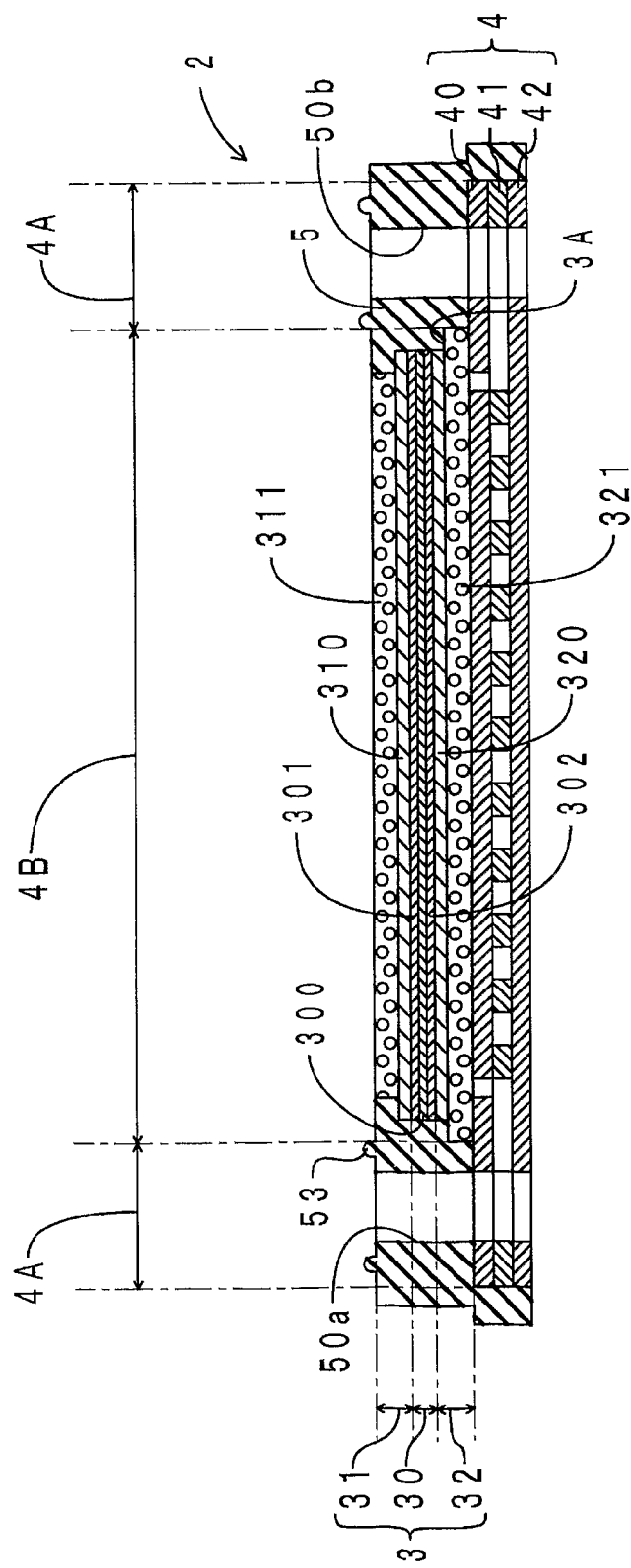
FIG. 18 is a XVIII-XVIII cross-sectional view of FIG. 16.

First, the configuration of a cell assembly for a fuel cell manufactured in accordance with the manufacturing method of a cell assembly for a fuel cell according to the present embodiment will be described. FIG. 16 is a perspective view of a cell assembly manufactured in accordance with the manufacturing method of a cell assembly for a fuel cell according to the present embodiment. FIG. 17 is an exploded perspective view of the cell assembly. FIG. 18 is a XVIII-XVIII cross-sectional view of FIG. 16. Components in FIGS. 16 to 18 corresponding to those in FIGS. 2 to 4 are denoted by the same reference symbols. As shown in FIGS. 16 to 18, the cell assembly 2 includes an electrode member 3, a separator 4, and a seal member 5.

The electrode member 3 is formed from an MEA 30, a gas diffusion layer 310 and a gas flow path layer 311 (an anode porous layer 31), and a gas diffusion layer 320 and a gas flow path layer 321 (a cathode porous layer 32). The shape and area of the gas diffusion layers 310, 320 are identical to the shape and area of the MEA 30. Therefore, the peripheral edge portions of the gas diffusion layers 310, 320 are aligned with the peripheral edge portion of the MEA 30 as viewed from above. Meanwhile, the gas flow path layer 311 and the gas flow path layer 321 have a generally similar shape to the MEA 30. The area of the gas flow path layer 311 on the anode side is smaller than the area of the MEA 30. Therefore, the peripheral edge portion of the gas flow path layer 311 is disposed more inward than the peripheral edge portions of the MEA 30 and the gas diffusion layers 310, 320. Conversely, the area of the gas flow path layer 321 on the cathode side is larger than the area of the MEA 30. Therefore, the peripheral edge portion of the gas flow path layer 321 is disposed more outward than the peripheral edge portions of the MEA 30 and the gas diffusion layers 310, 320. Thus, the cross section of the peripheral edge portion of the electrode member 3 in the thickness direction (up-down direction) has a stepped shape that projects increasingly outwardly from the top to the bottom. Namely, the electrode member 3 has a stepped portion 3A that is stepped as viewed in cross section in the thickness direction at the peripheral edge portion.

The seal member 5 has a rectangular frame shape, and is disposed in the seal member arrangement portion 4A of the separator 4. The seal member 5 coats the peripheral edge portion of the electrode member 3, and coats the top side and the lateral side of the separator 4.

The manufacturing method of a cell assembly for a fuel cell according to the present embodiment will be described next. The manufacturing method of a cell assembly for a fuel cell according to the present embodiment includes a preliminary production step, a member arrangement step, and an integration step.

Figure 19:
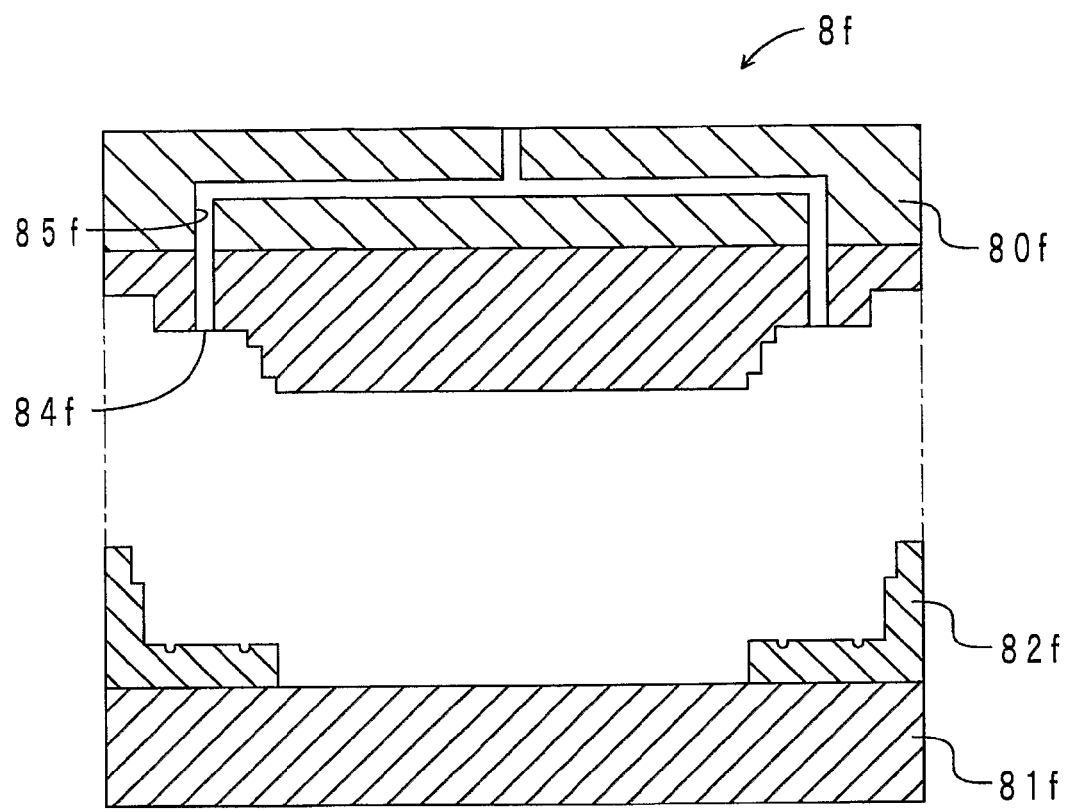
FIG. 19 is a cross-sectional view of a preforming die for use to produce a seal member preform in an open state.
Figure 20:
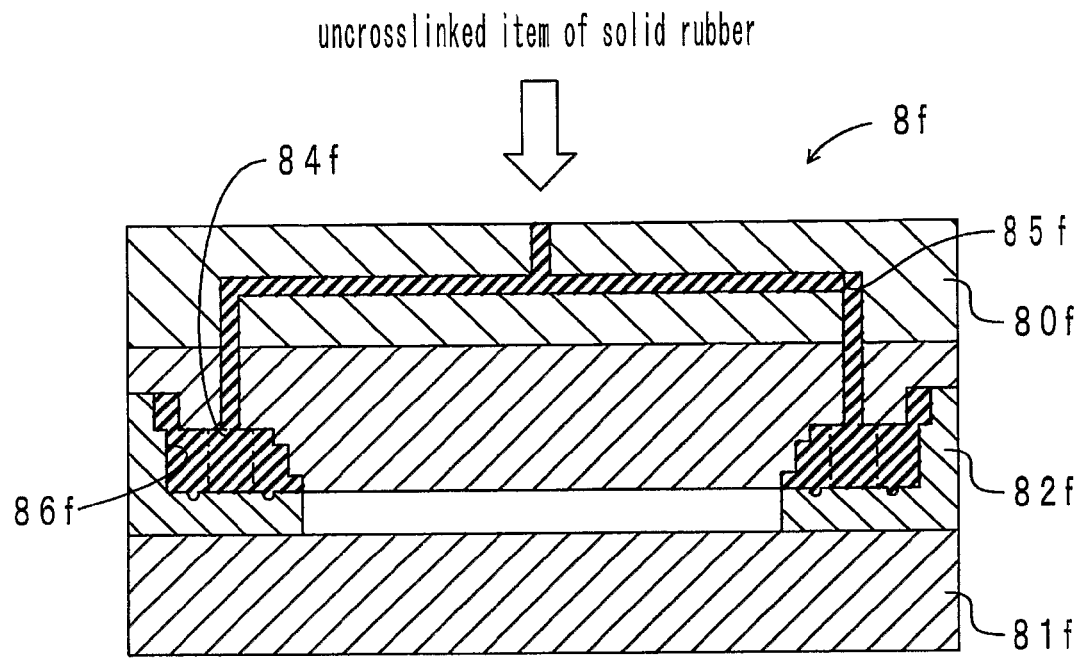
FIG. 20 is a cross-sectional view of the preforming die in a closed state.
Figure 21:
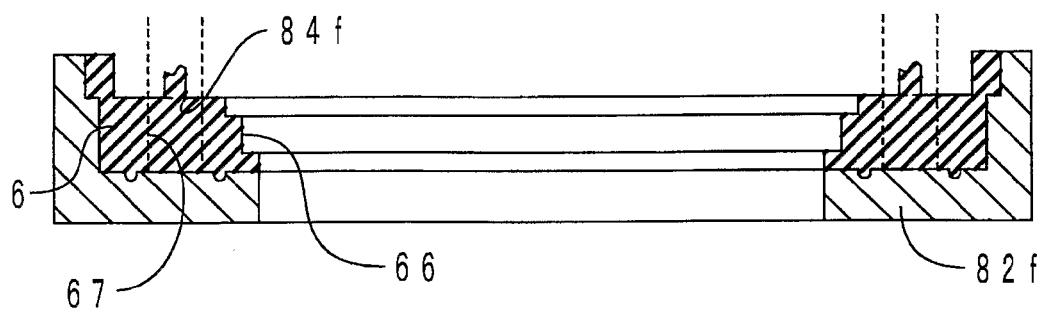
FIG. 21 is a cross-sectional view of the seal member preform after the die is removed.

First, the preliminary production step will be described. FIG. 19 is a cross-sectional view of a preforming die for use to produce a seal member preform in an open state. FIG. 20 is a cross-sectional view of the preforming die in a closed state. FIG. 21 is a cross-sectional view of the seal member preform after the die is removed.

Figure 22:
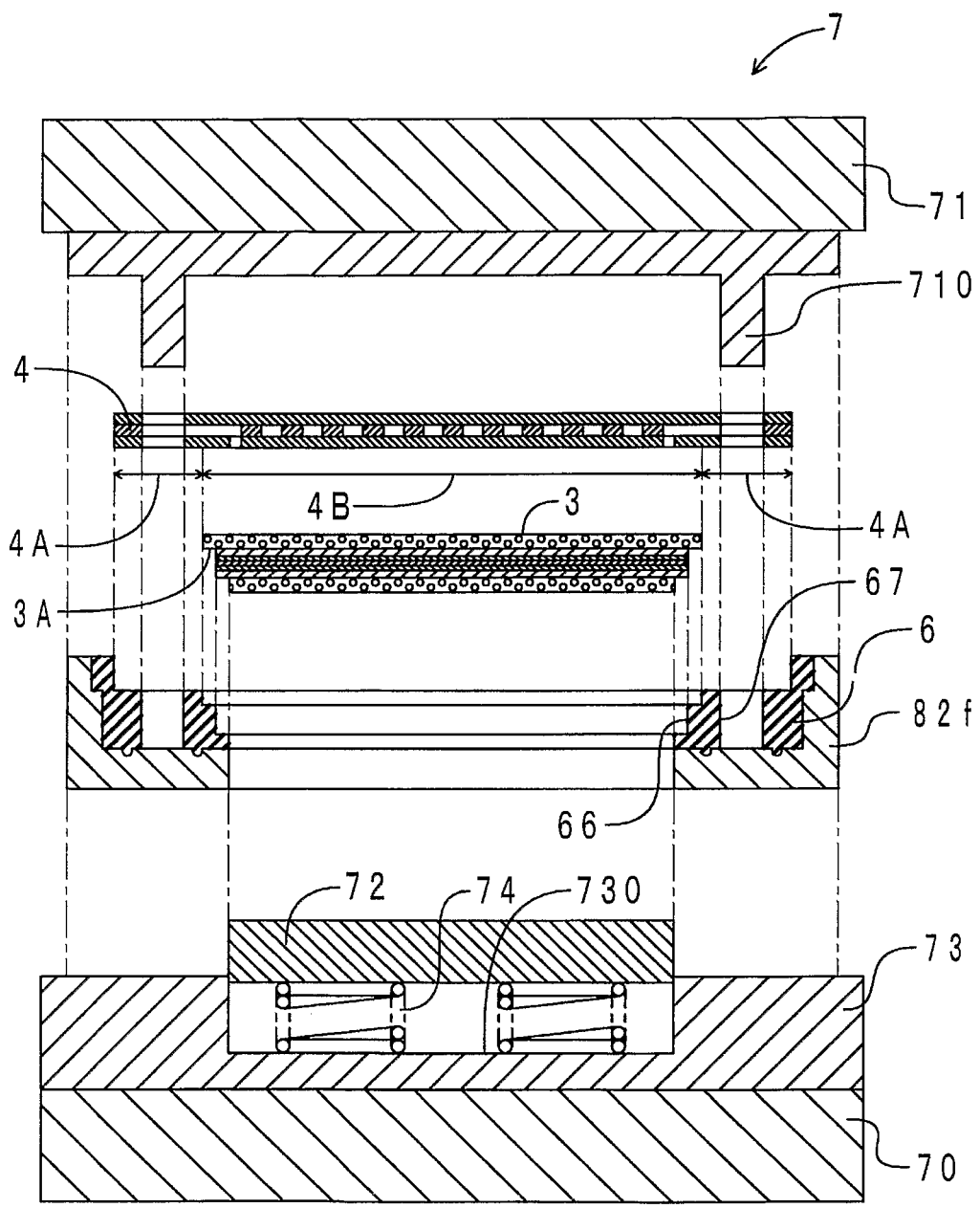
FIG. 22 is a cross-sectional view of a forming die for use in the manufacturing method of a cell assembly for a fuel cell according to the third embodiment in an open state.

In this step, the electrode member 3, the separator 4, and the seal member preform 6 which will become the seal member 5 after molding are produced in a predetermined shape (see FIG. 22 mentioned later). The production method of the electrode member 3 and the separator 4 is similar to that in the first embodiment. Thus, the description of the method is omitted herein.

The seal member preform 6 is produced by injection molding of an uncrosslinked item of solid rubber containing EPDM as a rubber component. As shown in FIG. 19, a preforming die 8f includes a first preforming die 80f, a second preforming die 81f, and an intermediate die 82f. The first preforming die 80f includes two, namely upper and lower, divided dies. A runner 85f and a gate 84f are formed in the first preforming die 80f. The gate 84f opens in a location corresponding to the inside of the through holes 50a, 50b shown in FIG. 18 mentioned earlier. The intermediate die 82f is disposed on the top side of the second preforming die 81f.

To produce the seal member preform 6, the preforming die 8f is first closed. That is, the preforming die 8f is shifted from an open state shown in FIG. 19 into a closed state shown in FIG. 20. With the die closed as shown in FIG. 20, the first preforming die 80f and the intermediate die 82f define a cavity 86f. An uncrosslinked item of solid rubber is next injected from an injection molding machine (not shown) into the cavity 86f via the runner 85f and the gate 84f as indicated by the white arrow in FIG. 20. After that, the preforming die 8f is removed to obtain the seal member preform 6. After the first preforming die 80f and the second preforming die 81f are removed, the seal member preform 6 is used in the subsequent member arrangement step together with the intermediate die 82f as shown in FIG. 21. The inner side of the frame of the seal member preform 6 has a stepped shape that projects increasingly inwardly from the top to the bottom. Namely, a die-symmetric stepped portion 66 having a shape that matches the stepped portion 3A of the electrode member 3 is formed on the inner side of the frame of the seal member preform 6. Thereafter, a portion of the seal member preform 6 that corresponds to the through holes 50a, 50b (indicated by the dotted lines in FIG. 21) is cut away to form a penetration hole 67 that penetrates in the thickness direction.

Figure 23:
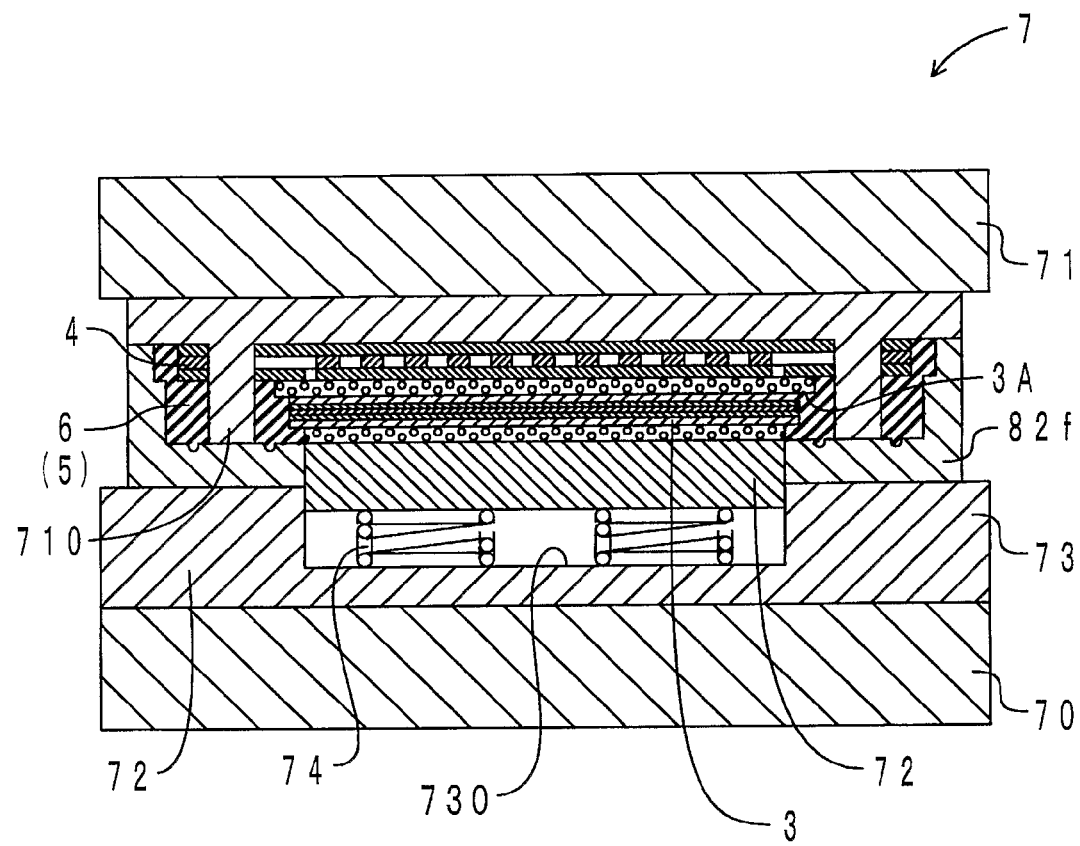
FIG. 23 is a cross-sectional view of the forming die in a closed state.

The member arrangement step will be described next. FIG. 22 is a cross-sectional view of a forming die in an open state. Components in FIG. 22 corresponding to those in FIG. 11 are denoted by the same reference symbols. FIG. 23 is a cross-sectional view of the forming die in a closed state.

In this step, the respective produced structural elements are disposed in a forming die 7. As shown in FIG. 22, the first forming die 70 and the second forming die 71 structuring the forming die 7 are disposed oppositely in the up-down direction from those in the first embodiment. Consequently, the base die 73 is disposed on the top side of the first forming die 70. A concave portion 730 that can house the pressing member 72 is formed in the top side of the base die 73. Spring members 74 are disposed on the bottom surface of the concave portion 730. The pressing member 72 is elastically supported by the spring members 74. The second forming die 71 includes two, namely upper and lower, divided dies. A convex portion 710 that projects downward is disposed on the lower divided die. The convex portion 710 prevents an uncrosslinked item from flowing into the penetration hole 67 of the seal member preform 6 and the through holes of the separator 4.

The intermediate die 82f on which the seal member preform 6 is placed is first disposed on the top side of the base die 73. The electrode member 3 is next disposed in the frame of the seal member preform 6. After that, the separator 4 is placed on the top side of the electrode member 3. Thereafter, the first forming die 70 and the second forming die 71 are aligned to close the die. With the die closed as shown in FIG. 23, the electrode member 3 is housed in the frame of the seal member preform 6. The stepped portion 3A at the peripheral edge portion of the electrode member 3 is in surface contact with the die-symmetric stepped portion 66 of the seal member preform 6. The bottom side of the electrode member 3 is pressed by the pressing member 72 from below.

The integration step will be described next. In this step, the forming die 7 is heated with the die kept closed. As a result of the heating, the seal member preform 6 is crosslinked to become the seal member 5. Moreover, the electrode member 3 and the separator 4 are integrated with each other via the seal member 5.

The manufacturing method of a fuel cell according to the present embodiment is similar to the manufacturing method of a fuel cell according to the first embodiment. Thus, the description of the method is omitted herein.

Regarding common structures, the manufacturing method of a cell assembly for a fuel cell and the manufacturing method of a fuel cell according to the present embodiment have operations and effects similar to those of the manufacturing method of a cell assembly for a fuel cell and the manufacturing method of a fuel cell according to the first embodiment.

According to the manufacturing method of a cell assembly of the present embodiment, the die-symmetric stepped portion 66 having a shape that matches the stepped portion 3A of the electrode member 3 can be formed on the inner side of the frame of the seal member preform 6 without dividing the seal member preform 6. Such a configuration is suitable for a case where it is difficult to produce the seal member preform 6 in a divided manner because, for example, the seal member 5 is so thin. In the member arrangement step, the electrode member 3 can be positioned by just placing the electrode member 3 in the frame of the seal member preform 6. Consequently, according to the manufacturing method of a cell assembly of the present embodiment, the cell assembly 2 can be manufactured efficiently.

According to the manufacturing method of a cell assembly of the present embodiment, the seal member preform 6 can be easily produced in a predetermined shape by injection molding. The opening of the gate 84f corresponds to the through holes 50a, 50b. Therefore, a mark of the gate 84f is cut away at the same time as a portion of the seal member preform 6 that corresponds to the through holes 50a, 50b (indicated by the dotted lines in FIG. 21) is cut away after the injection molding. Hence, no gate mark remains on the seal member 5. Consequently, the sealability is unlikely to reduce.

According to the manufacturing method of a cell assembly of the present embodiment, the seal member 5 covers the peripheral edge portion of the cell assembly 2 which includes the lateral side of the separator 4. That is, the seal member 5 protects the peripheral edge portion of the cell assembly 2. Consequently, in the fuel cell 1 in which the cell assemblies 2 are stacked, a short circuit between the cell assemblies 2 can be prevented even in the case where the cell assemblies 2 are warped or the like by, for example, an external force.

Other Embodiments

A manufacturing method of a cell assembly for a fuel cell and a manufacturing method of a fuel cell according to embodiments of the present invention have been described above. However, the present invention is not limited to the embodiments described above. The present invention can also be implemented in various modified or improved forms that may occur to those skilled in the art.

That is, the respective elements structuring the cell assembly for a fuel cell are not limited to those of the above embodiments in terms of material, shape, size, and the like. For example, in the above embodiments, the separator has a three-layer structure. However, the structure of the separator is not limited thereto. In place of the perfluorosulfonic acid film, a perfluorophosphonic acid film, a perfluorocarboxylic acid film, or a hydrocarbon polymer film may be used for the electrolyte membrane. In the above embodiments, the pair of porous layers are structured from a gas diffusion layer and a gas flow path layer with different porosities. In such a case, the porosity, area, shape, thickness, and the like of both the layers may be set as appropriate. The pair of porous layers may be structured from a gas diffusion layer and a gas flow path layer with different average pore diameters. Furthermore, the pair of porous layers may be identical to or different from each other in terms of structure. For example, the cell assembly for a fuel cell may be structured by stacking a separator and an electrode member having porous layers with different configurations as described in (1) and (2) below.

(1) [Gas Flow Path Layer/Gas Diffusion Layer/MEA/Gas Flow Path Layer/Separator]

According to an electrode member having the present configuration, a porous layer disposed on one side of the MEA in the thickness direction is formed from a gas diffusion layer that is disposed on one side of the MEA in the thickness direction and a gas flow path layer that is disposed on one side of the gas diffusion layer in the thickness direction and that has a greater porosity or average pore diameter than the gas diffusion layer. A porous layer disposed on the other side of the MEA in the thickness direction is formed from a gas flow path layer disposed on the other side of the MEA in the thickness direction.

(2) [Gas Flow Path Layer/Gas Diffusion Layer/MEA/Gas Diffusion Layer/Separator]

According to an electrode member having the present configuration, a porous layer disposed on one side of the MEA in the thickness direction is formed from a gas diffusion layer that is disposed on one side of the MEA in the thickness direction and a gas flow path layer that is disposed on one side of the gas diffusion layer in the thickness direction and that has a greater porosity or average pore diameter than the gas diffusion layer. A porous layer disposed on the other side of the MEA in the thickness direction is formed from a gas diffusion layer disposed on the other side of the MEA in the thickness direction.

In the above first and second embodiments, the seal member preform is structured by two divided bodies. In this case, the thickness and material of the uncrosslinked items may be adjusted depending on the properties required of the seal region. For example, rubbers made of different materials may be used for each seal region. In the above third embodiment, the seal member preform is produced by injection molding. However, the production method of the seal member preform is not limited to injection molding. For example, the seal member preform may be produced by press forming or the like. The seal member will be described in detail below.

[Seal Member]

In the cell assembly for a fuel cell of the present invention, a solid rubber with adhesiveness can be used as the seal member. The tensile product of the crosslinked item is preferably 1,500 MPa·% or more. The tensile product is defined as a product of tensile strength and breaking elongation, i.e., [tensile strength (MPa)×breaking elongation (%)]. A larger tensile product indicates that more energy is required to break. In the present description, values measured in accordance with JIS K6251 (2004) are employed for the tensile strength and breaking elongation. Measurements for tensile strength and breaking elongation were performed using No. 5 dumbbell specimens. In addition, the Mooney viscosity of the uncrosslinked item is preferably 40 M at 80° C. [40 ML (1+4) 80° C.] or more. The Mooney viscosity employs a value measured in accordance with JIS K6300-1 (2001).

More specifically, a solid rubber containing a rubber component such as the following may be used: ethylene-polypropylene rubber (EPM), ethylene-polypropylene-diene rubber (EPDM), acrylonitrile-butadiene rubber (NBR), hydrogenated acrylonitrile-butadiene rubber (H-NBR), styrene-butadiene rubber (SBR), and butadiene rubber (BR). The Type A durometer hardness of the crosslinked item (the seal member) is preferably 50 or more. Type A durometer hardness is a hardness measured by a Type A durometer as specified in JIS K6253 (2006).

For example, a rubber composition including the following contents of (A) to (D) is capable of crosslinking at a low temperature, and is well-suited in terms of high adhesive reliability and sealability of the crosslinked item. (A) One or more rubber components selected from a group consisting of ethylene-propylene rubber (EPM), ethylene-propylene-diene rubber (EPDM), acrylonitrile-butadiene rubber (NBR), and hydrogenated acrylonitrile-butadiene rubber (H-NBR); (B) a crosslinking agent selected from organic peroxides of which a 1-hour half-life period temperature is lower than or equal to 130° C.; (C) a crosslinking auxiliary agent; and (D) an adhesive component formed of at least one of a resorcinol compound together with a melamine compound and a silane coupling agent.

The crosslinking agent (B) is selected from organic peroxides of which the 1-hour half-life period temperature is lower than or equal to 130° C. Such organic peroxides include peroxyketal, peroxyester, diacyl peroxide, peroxydicarbonate, and the like. Particularly, at least one of the peroxyketal and the peroxyester of which the 1-hour half-life period temperature is higher than or equal to 100° C. is preferably employed, since crosslinking easily occurs at a temperature of approximately 130° C. and the rubber composition in which the crosslinking agent is added and kneaded can be handled easily. Particularly, one with a 1-hour half-life period temperature of 110° C. or higher is preferable.

Examples of the peroxyketal include n-butyl 4,4-di(t-butylperoxy)valerate, 2,2-di(t-butylperoxy)butane, 2,2-di(4,4-di(t-butylperoxy)cyclohexyl)propane, 1,1-di(t-butylperoxy)cyclohexane, 1,1-di(t-hexylperoxy)cyclohexane, 1,1-di(t-hexylperoxy)-3,3,5-trimethylcyclohexane, 1,1-di(t-butylperoxy)-2-methylcyclohexane, and the like. Examples of the peroxyester include t-butyl peroxybenzoate, t-butyl peroxyacetate, t-hexyl peroxybenzoate, 2,5-dimethyl-2,5-di(benzoylperoxy)hexane, t-butyl peroxy-2-ethylhexyl monocarbonate, t-butyl peroxylaurate, t-butyl peroxyisopropyl-monocarbonate, t-butyl peroxy-3,5,5-trimethylhexanoate, t-butyl peroxymaleic acid, t-hexyl peroxyisopropylmonocarbonate, and the like. Particularly, 1,1-di(t-butylperoxy)cyclohexane and t-butyl peroxyacetate are preferable, since the crosslinking agent using them is easily stored.

The amount of the crosslinking agent is preferably greater than or equal to 1 part by weight with respect to 100 parts by weight of the rubber component (A) described above so that the crosslinking reaction progresses sufficiently. In consideration of the storage stability of the prepared rubber composition, it is preferably less than or equal to 5 parts by weight.

The crosslinking auxiliary agent (C) may appropriately be selected according to the type of crosslinking agent (B) described above. Examples of the crosslinking auxiliary agent include a maleimide compound, triallyl cyanurate (TAC), triallyl isocyanurate (TAIC), trimethylolpropane trimethacrylate (TMPT), and the like. Particularly, using the maleimide compound is preferable since the crosslinking speed becomes faster. In this case, the amount of the crosslinking auxiliary agent is preferably greater than or equal to 0.1 parts by weight with respect to 100 parts by weight of the rubber component (A) described above so that the crosslinking reaction progresses sufficiently. The amount of the crosslinking auxiliary agent is preferably less than or equal to 3 parts by weight, since the adhesive force decreases when the crosslinking reaction becomes too fast due to a large amount of the crosslinking auxiliary agent.

The adhesive component (D) is formed of at least one of the resorcinol compound together with the melamine compound and the silane coupling agent. That is, the adhesive component may be only the resorcinol compound and the melamine compound, or only the silane coupling agent. In the case where both the resorcinol compound together with the melamine compound and the silane coupling agent are included, the adhesive force is further improved.

Examples of the resorcinol compound include resorcin, modified resorcin-formaldehyde resin, resorcin-formaldehyde (RF) resin, and the like. A single one or a mixture of two or more of these may be used. Particularly, the modified resorcin-formaldehyde resin is preferable in terms of low volatility, low hygroscopicity, and high compatibility with rubber. Examples of the modified resorcin-formaldehyde resin include those represented by general formulas (1) to (3) below. One shown by the general formula (1) is particularly preferable. Note that reference symbol "R" indicates a hydrocarbon group in the general formula (1). Reference symbols "n" all indicate an integer in the general formulas (1) to (3).

[Chem. 1]

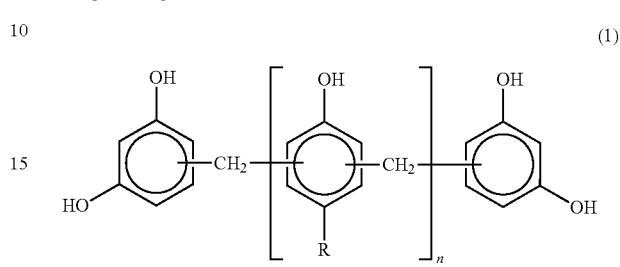

(1)

[Chem. 2]

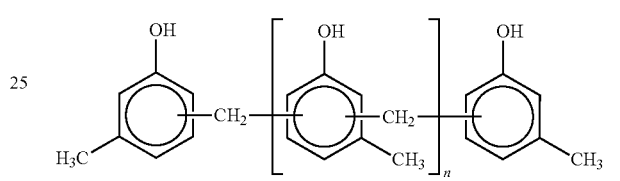

(2)

[Chem. 3]

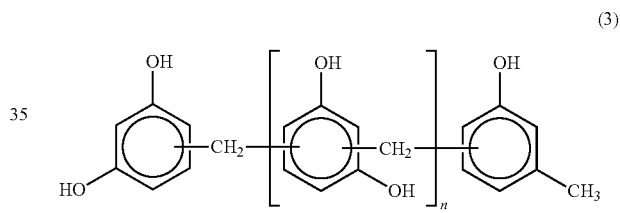

(3)

In order to obtain a desired adhesive force, the amount of the resorcinol compound is preferably greater than or equal to 0.1 parts by weight with respect to 100 parts by weight of the rubber component (A) described above. It is more preferably greater than or equal to 0.5 parts by weight. The amount of the resorcinol compound is preferably less than or equal to 10 parts by weight, since an excessive amount of the resorcinol compound causes a decrease in the properties of rubber. It is more preferably less than or equal to 5 parts by weight.

Examples of the melamine compound include a methylated formaldehyde melamine polymer, hexamethylene tetramine, and the like. One or more of these compounds may be used singly or in combination. These are decomposed by heat in the crosslinking, and supply formaldehyde to the system. Particularly, the methylated formaldehyde melamine polymer is preferable in terms of low volatility, low hygroscopicity, and high compatibility with rubber. The methylated formaldehyde melamine polymer represented by a general formula (4) below is preferable, for example. In the formula (4), reference symbol "n" indicates an integer. Particularly, a mixture including 43 to 44% by weight of a compound in which $n=1$, 27 to 30% by weight of a compound in which $n=2$, and 26 to 30% by weight of a compound in which $n=3$ in the general formula (4) is preferable.

[Chem. 4]

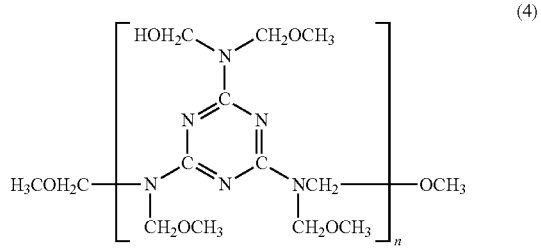

(4)

The compound ratio of the resorcinol compound and the melamine compound is preferably in a range of 1:0.5 to 1:2 by weight. It is more preferably in a range of 1:0.77 to 1:1.5. In the case where the compound ratio of the melamine compound with respect to the resorcinol compound is less than 0.5, the tensile strength, the stretch, and the like of the rubber tend to slightly decrease. On the other hand, when the compound ratio of the melamine compound exceeds 2, the adhesive force reaches a limit. Therefore, further increase in the compound ratio of the melamine compound leads to an increase in cost.

The silane coupling agent may appropriately be selected in consideration of the adhesiveness and the like from a group of compounds having an epoxy group, an amino group, a vinyl group, or the like as a functional group. Examples include vinyltrimethoxysilane, vinyltriethoxysilane, vinyl-tris(2-methoxyethoxy)silane, 3-methacryloxypropyltrimethoxysilane, 3-methacryloxypropyltriethoxysilane, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, N-2(aminoethyl)-3-aminopropyltrimethoxysilane, 3-aminopropyltrimethoxysilane, N-phenyl-3-aminopropyltrimethoxysilane, and the like. One or more of these compounds may be used singly or in combination. Particularly, when one or more selected from the group of compounds having an epoxy group is used, the adhesive force is improved, and the adhesive force hardly decreases even in the operational environment of a fuel cell. Specifically, 3-glycidoxypropyltrimethoxysilane, 3-glycidoxypropyltriethoxysilane, 3-glycidoxypropylmethyldiethoxysilane, 2-(3,4-epoxycyclohexyl)ethyltrimethoxysilane, and the like are preferable.

In order to obtain a desired adhesive force, the amount of the silane coupling agent is preferably greater than or equal to 0.5 parts by weight with respect to 100 parts by weight of the rubber component (A) described above. It is more preferably greater than or equal to 2 parts by weight. An excessive amount of silane coupling agent leads to a decrease in the properties of rubber, and possibly a decrease in processability. Therefore, the amount of the silane coupling agent is preferably less than or equal to 10 parts by weight, and more preferably, less than or equal to 6 parts by weight.

The rubber composition may include various additives which are used as additives for general rubber other than the contents of (A) to (D) described above. For example, it is preferable to include carbon black as a reinforcing agent. The grade of the carbon black is not particularly limited, and may appropriately be selected from SAF, ISAF, HAF, MAF, FEF, GPF, SRF, FT, MT, and the like. In order to obtain desired durability, the amount of the carbon black is preferably greater than or equal to 30 parts by weight with respect to 100 parts by weight of the rubber component (A) described above. Note that the amount of the carbon black is preferably less than or equal to 150 parts by weight in consideration of the easiness of kneading, forming processability, and the like.

Other additives include a softener, a plasticizer, an antioxidant, a tackifier, a processing aid, and the like. The softeners include: petroleum-based softeners such as process oil, lubricating oil, paraffin, liquid paraffin, and petrolatum; fatty oil-based softeners such as castor oil, linseed oil, canola oil, and palm oil; waxes such as tall oil, a rubber substitute, beeswax, carnauba wax, and lanolin; linoleic acid; palmitic acid; stearic acid; lauric acid; and the like. The amount of the softener is preferably up to approximately 40 parts by weight with respect to 100 parts by weight of the rubber component (A) described above. The plasticizers include organic acid derivatives such as dioctyl phthalate (DOP) and phosphoric acid derivatives such as tricresyl phosphate. The amount of the plasticizer is preferably approximately 40 parts by weight at most with respect to 100 parts by weight of the rubber component (A) described above, in a similar manner to that of the softener. The antioxidants include phenolic antioxidants, imidazole-based antioxidants, waxes, and the like, and the amount is preferably approximately 0.5 to 10 parts by weight with respect to 100 parts by weight of the rubber component (A) described above.

The rubber composition can be prepared by mixing the contents of (A) to (D) described above and the various additives as necessary. For example, the respective materials other than the crosslinking agent (B), the crosslinking auxiliary agent (C), and the adhesive component (D) are mixed in advance, and then are kneaded for several minutes at 80 to 140° C. After the kneaded product is cooled, the crosslinking agent (B), the crosslinking auxiliary agent (C), and the adhesive component (D) are added, and are kneaded for 5 to 30 minutes at a roll temperature of 40 to 70° C. using a roller such as an open roller, whereby the rubber composition can be prepared. Note that the adhesive component (D) may be added at the time of the preparatory mixture.

REFERENCE SIGNS LIST

1 Fuel cell
10a Air supply hole
10b Air discharge hole
11a Hydrogen supply hole
11b Hydrogen discharge hole
12a Coolant supply hole
12b Coolant discharge hole
13, 14 End plate
2 Cell assembly
3 Electrode member
30 MEA
31 Anode porous layer
32 Cathode porous layer
300 Electrolyte membrane
301 Anode catalyst layer
302 Cathode catalyst layer
310, 320 Gas diffusion layer
311, 321 Gas flow path layer
3A Stepped portion
4 Separator
4A Seal member arrangement portion
4B Electrode member arrangement portion
40 Cathode plate
41 Intermediate plate
42 Anode plate
5 Seal member
50a, 50b, 51a, 51b, 52a, 52b Through hole
53 Convex portion 6 seal member perform
60 first divided body
61 second divided body
62 first temporary assembly
63 outer divided body
64 inner divided body
65 inner temporary assembly
66 die-symmetric stepped portion
67 penetration hole
7 forming die
70 first forming die
71 second forming die
72 pressing member
73 base die
730 concave portion
74 spring member
710 convex portion
8a, 8b, 8c, 8f preforming die
80a, 80b, 80c, 80f first preforming die
81a, 81b, 81c, 81f second preforming die
82a, 82b, 82d, 82e, 82f intermediate die
83a, 83b die release film
84f gate
85f runner
86f cavity
800c, 810c, 820a, 820b concave portion

The invention claimed is:

1. A manufacturing method of a cell assembly for a fuel cell, the cell assembly including:
an electrode member having a membrane electrode assembly formed from an electrolyte membrane and a pair of electrode catalyst layers disposed on both sides of the electrolyte membrane in a thickness direction, and a pair of porous layers disposed on both sides of the membrane electrode assembly in the thickness direction;
a separator having an electrode member arrangement portion arranged to be stacked with the electrode member and with which one side of the electrode member in the thickness direction is in contact, and a seal member arrangement portion having a frame shape and disposed on an outer side of the electrode member arrangement portion in a planar direction; and
a seal member formed from a crosslinked item of solid rubber and disposed in the seal member arrangement portion to seal a peripheral edge portion of the electrode member along a shape of the peripheral edge portion and integrate the electrode member and the separator with each other, the method comprising:
producing the electrode member, the separator, and a seal member preform, which has a frame shape and which is formed from an uncrosslinked item of solid rubber having adhesiveness, in a predetermined shape in advance, as a preliminary production step;
arranging the electrode member, the separator, and the seal member preform in a forming die including a pressing member such that the electrode member is housed in a frame of the seal member preform and such that one side of the electrode member in the thickness direction is in contact with the electrode member arrangement portion, and closing the forming die while the pressing member is pressing the other side of the electrode member in the thickness direction, as a member arrangement step;
moving the pressing member relative to a surface of the forming die in which the pressing member is accommodated; and
pressurizing and heating the forming die to crosslink the uncrosslinked item so that the seal member seals the peripheral edge portion of the electrode member and integrates the electrode member and the separator with each other, as an integration step.

2. The manufacturing method of a cell assembly for a fuel cell according to claim 1, wherein
the electrode member has a stepped portion that is stepped as viewed in cross section in the thickness direction in at least a part of the peripheral edge portion, and
a die-symmetric stepped portion having a shape that matches the stepped portion is produced on an inner side of the frame of the seal member preform in the preliminary production step.

3. The manufacturing method of a cell assembly for a fuel cell according to claim 1, wherein the forming die further includes a base die having a concave portion, the method further comprising:
housing the pressing member in the concave portion;
projecting the pressing member from the concave portion;
elastically supporting the pressing member by providing an elastic member interposed between the pressing member and a bottom surface of the concave portion;
pressing, via the pressing member, the other side of the electrode member in the thickness direction utilizing an elastic force of the elastic member during closing of the forming die in the member arrangement step.

4. The manufacturing method of a cell assembly for a fuel cell according to claim 3, wherein the providing the elastic member interposed between the pressing member and the bottom surface of the concave portion, comprises providing a spring.

* * * * *

UNITED STATES PATENT AND TRADEMARK OFFICE
CERTIFICATE OF CORRECTION

| | | |
|---|---|---|
| PATENT NO. | : 9,017,901 B2 | Page 1 of 1 |
| APPLICATION NO. | : 13/203989 | |
| DATED | : April 28, 2015 | |
| INVENTOR(S) | : Hideaki Tanahashi et al. | |

It is certified that error appears in the above-identified patent and that said Letters Patent is hereby corrected as shown below:

In the Specification

Column 1, line 5, after the title of the invention and before "TECHNICAL FIELD", of the printed patent, please insert

--JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Sumitomo Riko Company Limited and 2) Toyota Jidosha Kabushiki Kaisha.--

Signed and Sealed this
First Day of September, 2015

Michelle K. Lee
*Director of the United States Patent and Trademark Office*